(12) United States Patent
Wakayama et al.

(10) Patent No.: US 7,528,768 B2
(45) Date of Patent: May 5, 2009

(54) RADAR DEVICE

(75) Inventors: Toshio Wakayama, Tokyo (JP); Takayuki Inaba, Tokyo (JP); Satoru Murayama, Tokyo (JP); Takashi Sekiguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/870,106

(22) Filed: Oct. 10, 2007

(65) Prior Publication Data

US 2008/0309546 A1 Dec. 18, 2008

(30) Foreign Application Priority Data

Jun. 13, 2007 (JP) ............................. 2007-156546

(51) Int. Cl.
*G01S 13/08* (2006.01)
*G01S 13/00* (2006.01)

(52) U.S. Cl. .................. 342/196; 342/118; 342/129; 342/134; 342/146; 342/192; 342/194

(58) Field of Classification Search ................ 342/118, 342/128–134, 139, 192, 194, 196
See application file for complete search history.

(56) References Cited

U.S. PATENT DOCUMENTS

| | | | | |
|---|---|---|---|---|
| 4,271,412 A | * | 6/1981 | Glass et al. | 342/98 |
| 4,916,452 A | * | 4/1990 | Borchert et al. | 342/109 |
| 5,252,980 A | * | 10/1993 | Gray et al. | 342/59 |
| 5,394,155 A | * | 2/1995 | Rubin et al. | 342/192 |
| 5,481,504 A | * | 1/1996 | Rosenbach et al. | 367/101 |
| 5,731,778 A | * | 3/1998 | Nakatani et al. | 342/70 |
| 5,751,240 A | * | 5/1998 | Fujita et al. | 342/70 |
| 5,867,117 A | * | 2/1999 | Gogineni et al. | 342/22 |
| 5,920,280 A | * | 7/1999 | Okada et al. | 342/109 |
| 6,040,796 A | * | 3/2000 | Matsugatani et al. | 342/70 |
| 6,204,803 B1 | * | 3/2001 | Uehara | 342/70 |

(Continued)

FOREIGN PATENT DOCUMENTS

WO    WO 2006/085352 A1    8/2006

OTHER PUBLICATIONS

U.S. Appl. No. 11/791,732, filed Feb. 8, 2005.

(Continued)

*Primary Examiner*—Thomas H Tarcza
*Assistant Examiner*—Peter M Bythrow
(74) *Attorney, Agent, or Firm*—Oblon, Spivak, McClelland, Maier & Neustadt, P.C.

(57) ABSTRACT

A radar device includes: an oscillator for generating a wave at a plurality of transmission frequencies; a transmitting antenna; a receiving antenna; a receiver for generating a real received signal; a Fourier transform unit for performing a Fourier transform on the real received signal in a time direction; a spectral peak detecting unit for receiving an input of a result of the Fourier transform to extract peak complex signal values of Doppler frequency points having a maximum amplitude; a distance calculating unit for storing the peak complex signal values and for calculating a distance to a reflecting object based on the stored peak complex signal values to output the obtained distance as a measured distance value; and a distance sign determining unit for determining validity of the measured distance value and for outputting the measured distance value and the Doppler frequency according to a result of determination.

11 Claims, 12 Drawing Sheets

U.S. PATENT DOCUMENTS

| | | | | |
|---|---|---|---|---|
| 6,229,474 | B1 * | 5/2001 | Uehara | 342/70 |
| 6,903,678 | B2 * | 6/2005 | Kumon et al. | 342/70 |
| 6,924,762 | B2 * | 8/2005 | Miyake et al. | 342/70 |
| 7,053,816 | B2 * | 5/2006 | Kai | 342/70 |
| 7,205,932 | B2 * | 4/2007 | Fiore | 342/133 |
| 7,248,207 | B2 * | 7/2007 | Ohnishi | 342/93 |
| 7,339,518 | B2 * | 3/2008 | Natsume et al. | 342/70 |

OTHER PUBLICATIONS

Richard J. Doviak, et al., "3. Radar and its Environment", in Doppler Radar and Weather Observations Second Edition, Academic Press, Inc., 1993, pp. 30-53 and two cover pages.

Merill Ivan Skolnik, "Introduction to Radar Systems", Third Ed., McGraw-Hill Higher Education, 2001, pp. 610-615 and cover page.

Takayuki Inaba, "Multiple Target Detection for Stepped Multiple Frequency Interrupted CW Radar", the IEICE transactions B, vol. J89-B, No. 3, 2006 with its English summary, pp. 373-383.

U.S. Appl. No. 11/870,106, filed Oct. 10, 2007, Wakayama et al.

U.S. Appl. No. 11/872,252, filed Oct. 15, 2007, Wakayama et al.

* cited by examiner

RADAR DEVICE

BACKGROUND OF THE INVENTION

1. Field of the Invention

The present invention relates to a radar device for emitting a wave into space, receiving the wave reflected by an object present in the space, and for performing signal processing on the received wave to measure the object.

2. Description of the Related Art

Generally, a radar emits an electromagnetic wave into space and receives the electromagnetic wave reflected by a target present in the space to know the presence/absence of the target, specifically, to detect the target. When the target moves relative to the radar, the measurement of a frequency shift caused by the Doppler effect, specifically, the measurement of a Doppler frequency also allows measurement of a relative velocity of the target, specifically, a Doppler velocity.

For the measurement of the Doppler frequency, an I/Q detection system for obtaining two orthogonal signal components as received signals is generally used. According to this detection system, each of a received wave and a local wave is divided into two to prepare two combinations of the received wave and the local wave. For each combination, the received wave and the local wave are mixed by using a mixer to obtain received signals in two channels. The two received signal channels are referred to as an In-phase channel (I-channel) and a Quadrature-phase channel (Q-channel), respectively.

For obtaining the Q-channel received signal of the received signals in two channels, a phase of any of the received wave and the local wave is rotated through 90 degrees. As a result, orthogonal components between the I-channel and the Q-channel are obtained. By performing a Fourier transform on a complex received signal obtained by regarding the I-channel as a real part and the Q-channel as an imaginary part, an amplitude of a frequency corresponding to a target Doppler frequency becomes larger. As a result, the target Doppler frequency can be obtained (for example, see R. J. Doviak and D. S. Zrnic, "3. Radar and Its Environment," in Doppler Radar and weather Observations, Second Ed., p. 30-53, Academic Press, Inc., 1993.).

When the received signal is obtained only for one channel, specifically, only the I-channel is obtained, the received signal is a real signal. In this case, the Fourier transform of the received signal provides an amplitude distribution symmetrical about a frequency of 0. Therefore, even if the target Doppler frequency is positive, the amplitude becomes larger at two points, one of which is in a positive frequency and the other is in a negative frequency (the amplitude has two peaks in the frequency) after the Fourier transform. On the contrary, even if the target Doppler frequency is negative, the amplitude similarly becomes larger at two points (has two peaks), one of which is in the positive frequency and the other is in the negative frequency. Specifically, even if an absolute value of the Doppler frequency is obtained, a sign of the absolute value cannot be determined. Therefore, the sign of the Doppler frequency remains ambiguous. The ambiguous sign of the Doppler frequency means impossibility in determining whether the target is approaching or receding.

Similar ambiguity in the sign of the frequency also appears in a radar using a digital beam forming (DBF) system corresponding to a technique of synthesizing received beams through signal processing. In the DBF system, received signals obtained from a plurality of received elements are subjected to the Fourier transform in an element direction to obtain a signal distribution in an angular direction. Specifically, the DBF system is a technique of synthesizing the received beams through signal processing (for example, see M. I. Skolnik, Introduction to Radar Systems, Third Ed., pp. 610-614, McGraw-Hill, 2001).

In such a DBF-system radar, when the received signal is obtained only for one channel, specifically, only a real received signal is obtained, an amplitude pattern of a received beam obtained by performing the Fourier transform on the received signal is symmetrical on the positive angle side and the negative angle side about a front direction defined as 0 degree. Specifically, it is uncertain whether an incoming angle of the received wave is positive or negative.

As described above, in the Doppler radar, when only a real signal (only for the I-channel) is obtained as the received signal, the sign of the Doppler frequency cannot be obtained. Furthermore, when a DBF-system antenna is used, information indicating whether a target angle (defining the front direction as 0 degree) is positive or negative cannot be obtained. However, if a radar device is configured to have the I-channel alone, the number of components advantageously becomes less than in the case where the radar device is configured to have two channels, i.e., the I-channel and the Q-channel. Therefore, the radar device can be reduced in size as well as in cost.

SUMMARY OF THE INVENTION

The present invention is devised to solve the above-mentioned problem of incompatibility between the ambiguity in sign and the reduction in size and cost, and has an object of providing a radar device allowing a sign of a Doppler frequency or a sign of a target angle to be determined as positive or negative even when only a real signal is obtained as a received signal.

The present invention provides a radar device for emitting a wave into space, receiving the wave reflected by an object present in the space, and performing signal processing on the received wave to measure the object. The radar device includes: an oscillator for generating the wave at a plurality of transmission frequencies; a transmitting antenna for emitting the wave generated from the oscillator into the space; a receiving antenna for receiving an incoming wave; a receiver for detecting the received wave received by the receiving antenna to generate a real received signal; a Fourier transform unit for performing a Fourier transform on the real received signal generated from the receiver in a time direction or an element direction or an element direction; and a spectral peak detecting unit for receiving an input of a result of the Fourier transform from the Fourier transform unit to extract peak complex signal values of Doppler frequency or angle points at which an amplitude is maximum. Also, the radar device includes: a distance calculating unit for storing the peak complex signal values from the spectral peak detecting unit, which are obtained by using the plurality of transmission frequencies, and for calculating a distance to the reflecting object based on the stored peak complex signal values to output the obtained distance as a measured distance value; and a distance determining unit for determining validity of the measured distance value obtained from the distance calculating unit and for outputting the measured distance value calculated in the distance calculating unit and the Doppler frequency or angle detected in the spectral peak detecting unit according to a result of determination.

According to the present invention, even when only a real signal is obtained as a received signal, it can be determined whether the sign of a Doppler frequency or a target angle is positive or negative.

DETAILED DESCRIPTION OF THE PREFERRED EMBODIMENTS

First Embodiment

Figure 1:
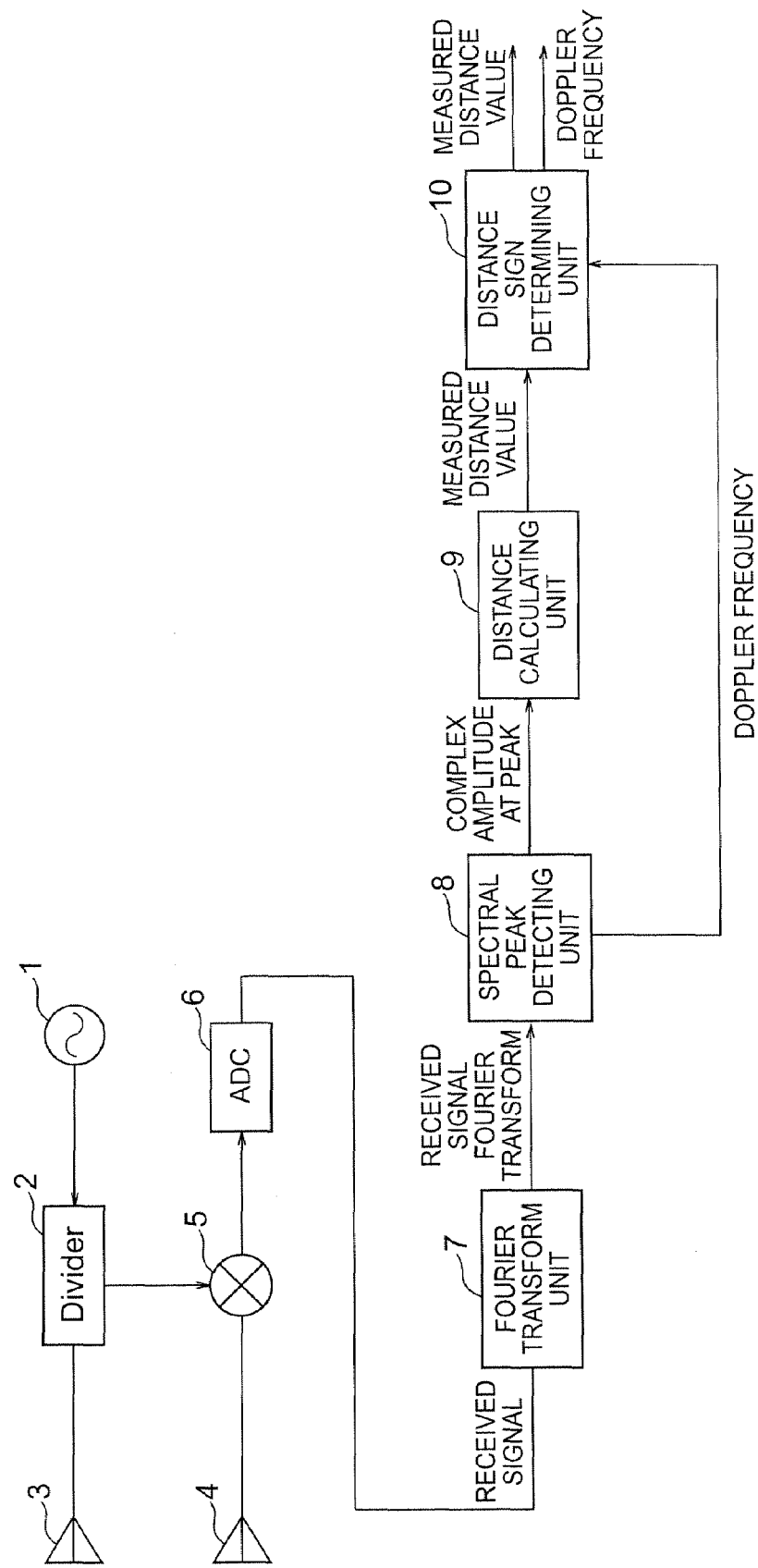
FIG. 1 is a block diagram illustrating a configuration of a radar device according to a first embodiment of the present invention.

FIG. 1 is a block diagram illustrating a configuration of a radar device according to a first embodiment of the present invention. The radar device illustrated in FIG. 1 includes an oscillator 1, a divider 2, a transmitting antenna 3, a receiving antenna 4, a receiver 5, and an A/D converter 6. The oscillator 1 generates a transmission wave. The divider 2 divides the transmission wave output from the oscillator 1. One of the transmission waves output from the divider 2 is input to the transmitting antenna 3 which in turn emits the transmission wave into space. The receiving antenna 4 receives a reflected wave generated by the transmission wave reflected by an object present in the space to obtain a received wave. The received wave is input from the receiving antenna 4 to the receiver 5 where the received wave is mixed with the output of the transmission wave input from the divider 2 to generate a received signal. The A/D converter 6 performs analog-to-digital (AD) conversion on the received signal output from the receiver 5 to generate a digital received signal.

The radar device also includes a Fourier transform unit 7, a spectral peak detecting unit 8, a distance calculating unit 9, and a distance sign determining unit 10. The Fourier transform unit 7 performs a Fourier transform on the received signal to calculate the Fourier transform of the received signal. The spectral peak detecting unit 8 receives the received signal Fourier transform input from the Fourier transform unit 7 to output Doppler frequencies at which an amplitude has the maximum value and complex amplitude values at the Doppler frequency points. The distance calculating unit 9 receives and stores the complex amplitudes input from the spectral peak detecting unit 8, and uses the complex amplitudes obtained by transmitting transmission waves at different transmission frequencies, thereby calculating a distance to a reflecting object. The distance sign determining unit 10 serves as a distance determining unit to determine the validity of a measured distance value obtained in the distance calculating unit 9 to output the measured distance value obtained in the distance calculating unit 9 and the Doppler frequency calculated in the spectral peak detecting unit 8 according to the result of determination. The distance sign determining unit 10 determines whether the sign of the measured distance value obtained in the distance calculating unit 9 is positive or negative. Only when the measured distance value is positive, the distance sign determining unit 10 outputs the Doppler frequency calculated in the spectral peak detecting unit 8.

Next, an operation of the radar device according to the first embodiment will be described. The oscillator 1 generates a transmission wave. A transmission frequency band frequently used in the radar device is a microwave band or a millimeter wave band. In the present invention, however, a transmission frequency of the radar device is not particularly limited. Hereinafter, the description will be given supposing that the transmission wave is a radio wave. However, the present invention is similarly applicable to the use of a laser beam corresponding to a kind of electromagnetic wave, specifically, to a laser radar. Furthermore, the application of the present invention is not limited to the radar using the electromagnetic wave. The present invention is also applicable to a radar using a sonic wave (SODAR).

The transmission frequency of the transmission wave output from the oscillator 1 is switched between multiple patterns on the time-division basis. For simplification, the transmission frequency herein is alternately switched between two patterns. The transmission wave generated in the oscillator 1 is input to the divider 2. The divider 2 divides the transmission wave into multiple (two) transmission waves and outputs the obtained transmission waves. One of the transmission wave outputs obtained by the division is output to the transmitting antenna 3. The other transmission wave output is output to the receiver 5 as a local wave.

The transmitting antenna 3 serving as a transmission element emits the transmission wave input from the divider 2 into space. The emitted transmission wave is reflected by a reflecting object present in the space. A part of the resultant reflected wave returns to the position of the radar device. The reflected wave reaching the position of the radar is captured by the radar device through the receiving antenna 4. Herein, the reflected wave captured by the receiving antenna 4 is referred to as a received wave. The receiver 5 mixes the received wave and the transmission wave to generate a received signal having a frequency corresponding to a difference between the transmission wave and the received wave (difference frequency). The difference frequency is equal to a Doppler frequency of the reflecting object.

The receiver 5 may include an amplifier as needed. However, the amplifier is not particularly explicitly illustrated in FIG. 1 because it does not limit the system employed by the radar device according to the present invention.

The receiver 5 outputs the received signal generated at each of the frequencies to the A/D converter 6. The A/D converter 6 performs analog-to-digital conversion on the input received signal to generate a digital received signal.

It is assumed that a transmission wave at a transmission angular frequency $\omega_1$ is expressed by a time-series signal given by the following Formula (1).

[Formula 1]
$$s_T(t) = A_0 \cos(\omega_1 t) \quad (1)$$

where t is time, and $A_0$ is an amplitude.

The received wave is expressed by the following Formula (2). As expressed by Formula (2), an angular frequency of the received wave is shifted from that of the transmission wave by a Doppler angular frequency $\omega_D$, and a phase shift proportional to a distance r is generated in the received wave.

[Formula 2]
$$s_{RF}(t) = A \cos\left\{(\omega_1 + \omega_D)t - \frac{2\omega_1}{c}r + \theta_r\right\} \quad (2)$$

where A is an amplitude of the received wave, and $\theta_r$ is a constant representing an initial phase of the received wave when a distance to the reflecting object is 0 and is determined by a length of a power feeding path for the received wave or a phase characteristic of radio wave reflection by a target.

It is assumed that a transmission wave component (local signal) input from the divider 2 to the receiver 5 is expressed by the following Formula (3).

[Formula 3]
$$s_L(t) = \cos(\omega_1 t + \theta_L) \quad (3)$$

where $\theta_L$ is a constant representing an initial phase of the local signal, which is determined by a length of a power feeding path of the local signal.

The received signal output from the receiver 5 is obtained by multiplying $S_{RF}(t)$ in Formula (2) by $S_L(t)$ in Formula (3) and then removing a harmonic component from the result of multiplication. The received signal is expressed by the following Formula (4).

[Formula 4]
$$s_{R1}(t) = \frac{A}{2} \cos\left(\omega_D t - \frac{2\omega_1}{c}r + \theta_0\right) \quad (4)$$

where $\theta_0 = \theta_r - \theta_L$.

Formula (4) expressed in an exponential function results in the following Formula (5).

[Formula 5]
$$s_{R1}(t) = \frac{A}{4} \left\{ e^{j\left(\omega_D t - \frac{2\omega_1}{c}r + \theta_0\right)} + e^{-j\left(\omega_D t - \frac{2\omega_1}{c}r + \theta_0\right)} \right\} \quad (5)$$

Assuming that a signal component obtained by performing the Fourier transform on the received signal $S_{R1}(t)$ and then extracting a component of the angular frequency $\omega_D$ therefrom is $S_{R+}$ and a signal component obtained by performing the Fourier transform on the received signal $S_{R1}(t)$ and then extracting a component of the angular frequency $-\omega_D$ therefrom is $S_{R-}$, the signal components are expressed by the following Formulae (6) and (7), respectively.

[Formula 6]
$$s_{R1+} = A' e^{j\left(-\frac{2\omega_1}{c}r + \theta_0\right)} \quad (6)$$

[Formula 7]
$$s_{R1-} = A' e^{-j\left(-\frac{2\omega_1}{c}r + \theta_0\right)} \quad (7)$$

where A' is an amplitude of the extracted signal component and is obtained by multiplying the amplitude of the signal expressed by Formula (5) by a gain of the Fourier transform, $S_{R+}$ and $S_{R-}$ are complex amplitudes of peaks detected by the spectral peak detecting unit 8, $S_{R1+}$ is a true signal component, and $S_{R1-}$ is a false signal component generated by ambiguity in the sign of the Doppler frequency. The false signal component is generated by the absence of I/Q detection in the receiver 5.

A phase of the true signal component $S_{R1+}$ is expressed by the following Formula (8).

[Formula 8]
$$\phi_{R1+} = -\frac{2\omega_1}{c}r + \theta_0 \quad (8)$$

As in Formula (8), a phase of the true signal component is expressed by the following Formula (9) when the transmission angular frequency is $\omega_2$.

[Formula 9]
$$\phi_{R2+} = -\frac{2\omega_2}{c}r + \theta_0 \quad (9)$$

The calculation of a phase difference between the phase obtained by Formula (8) and that obtained by Formula (9) results in the following Formula (10).

[Formula 10]
$$\Delta\phi_{R+} = \phi_{R2+} - \phi_{R1+} = -\frac{2\Delta\omega}{c}r = -\frac{4\pi\Delta f}{c}r \quad (10)$$

where $\Delta\omega = \omega_2 - \omega_1$, and $\Delta f = \Delta\omega/2\pi$

Therefore, the use of the relation expressed by Formula (10) allows a distance r to be calculated. Specifically, since the phase difference between the complex amplitudes obtained by the observation using two transmission frequencies is proportional to the distance to the reflecting object, the distance calculating unit 9 calculates the distance to the reflecting object by the following Formula (11).

[Formula 11]
$$r = -\frac{c\Delta\phi_{R+}}{4\pi\Delta f} \quad (11)$$

Note that, the calculation of the distance described above is premised on the use of a Doppler frequency component with a correct sign.

In practice, the receiver 5 does not conduct I/Q detection in the radar device having the configuration shown in FIG. 1. Therefore, the output received signal is a real signal. Accordingly, an amplitude of the Doppler spectrum is symmetrical about the Doppler frequency of 0, thereby causing ambiguity in the sign of the Doppler frequency. Specifically, even though the true signal component $S_{R1+}$ should be used, there is a possibility that the false signal component $S_{R1-}$ is erroneously used.

For example, when the positive Doppler frequency component is erroneously extracted when the true Doppler frequency is negative, the extracted component is $S_{R1-}$ expressed by Formula (7). Similarly, a phase difference $\Delta\phi_{R-}$ between $S_{R1-}$ and $S_{R2-}$, which is calculated by obtaining $S_{R2-}$ through the observation using the transmission angular frequency ω2 is expressed by the following Formula (12).

[Formula 12]

$$\Delta\phi_{R-} = \frac{2\Delta\omega}{c}r = \frac{4\pi\Delta f}{c}r \quad (12)$$

By performing the same distance calculating process as that of Formula (11) for $\Delta\phi_{R-}$ expressed by Formula (12), a measured distance value r' is given by the following Formula (13).

[Formula 13]

$$r' = -\frac{c\Delta\phi_{R-}}{4\pi\Delta f} = -r \quad (13)$$

As can be understood from Formula (13), when the distance is calculated using the Doppler frequency component with the incorrect sign, the obtained measured distance value is negative. Therefore, based on the negative measured distance value, it can be determined that the spectral peak of the Doppler frequency with the incorrect sign is erroneously detected.

Figure 2:
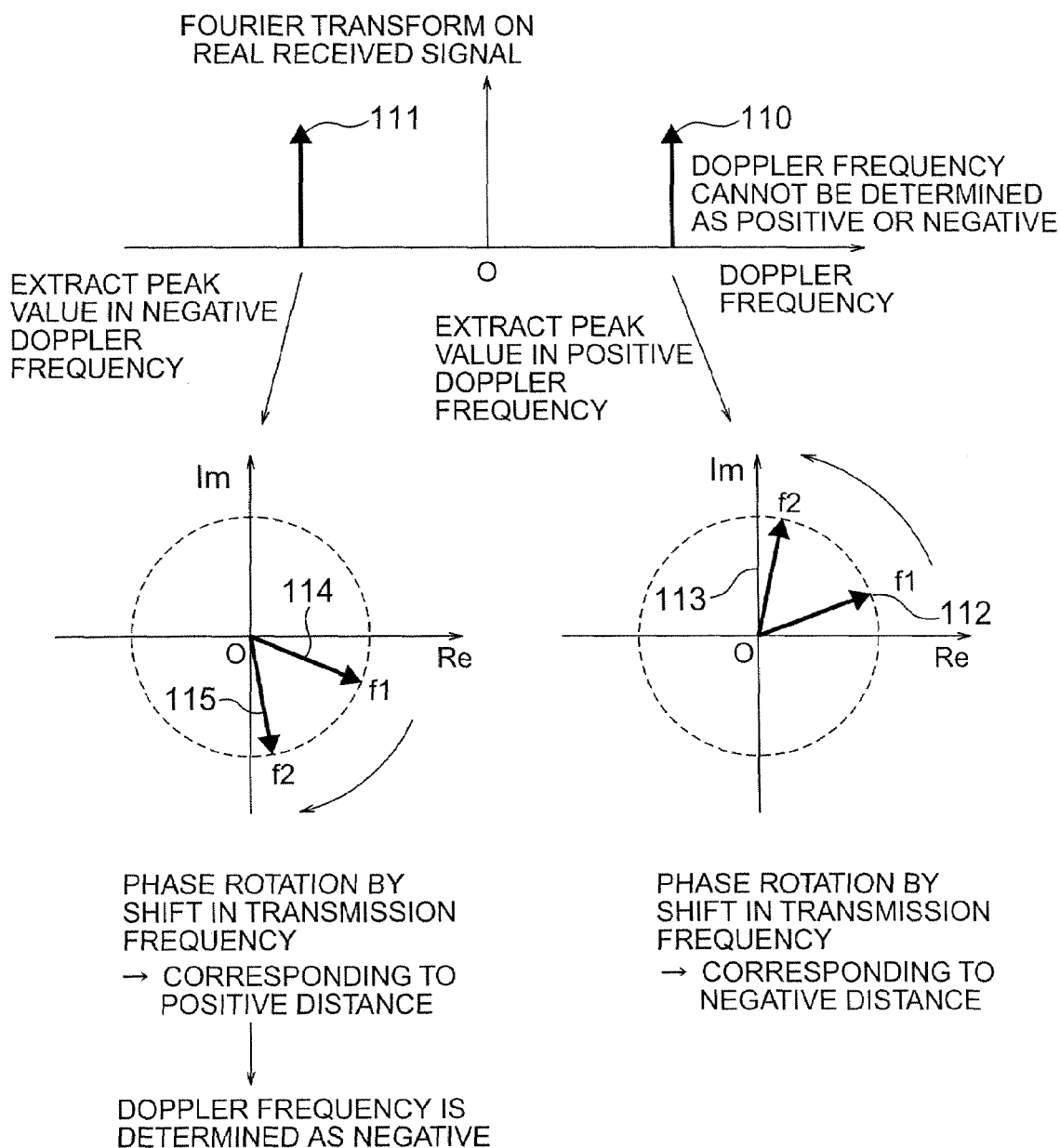
FIG. 2 is a view illustrating the principle of the radar device according to the first embodiment of the present invention.

FIG. 2 schematically illustrates the above description. FIG. 2 assumes the situation where two Doppler spectral peaks 110 and 111 having the same absolute value of the Doppler frequency but with different signs. For the Doppler frequency at the peak 110, it is assumed that a complex amplitude 112 is obtained for the use of a transmission frequency f1 while a complex amplitude 113 is obtained for the use of a transmission frequency f2. For the Doppler frequency at the peak 111, it is assumed that a complex amplitude 114 is obtained for the use of the transmission frequency f1 while a complex amplitude 115 is obtained for the use of the transmission frequency f2.

When the peak 110 is selected, the phase difference calculated by Formula (10) is positive. Therefore, the distance calculated by Formula (11) is negative. Specifically, assuming the positive Doppler frequency, the negative distance is calculated. On the other hand, when the peak 111 is selected, the phase difference calculated by Formula (10) is negative, and therefore the distance calculated by Formula (11) is positive. Specifically, assuming the negative Doppler frequency, the positive distance is calculated. Based on the above results, it can be determined that the negative Doppler frequency is correct in the situation illustrated in FIG. 2.

In view of the above-mentioned characteristic, the peaks are detected both for the positive Doppler frequency and the negative Doppler frequency. Only when the calculation of distance provides the result of a positive value, the measured distance value and the Doppler frequency are output. In this manner, the correct Doppler frequency is output.

Since $\Delta\phi_{R+}$ is a value of the phase, an interval length which allows the calculation of the phase difference without ambiguity is 2π. In the radar device according to the first embodiment, when the interval length of 2π is expressed by −π to π, an interval length from −π to 0 is assigned to a positive distance, whereas an interval length from 0 to π is assigned to a negative distance. When the assumed maximum distance is $r_{max}$, a difference Δf between the transmission frequencies is set as expressed by Formula (14).

[Formula 14]

$$\Delta f \leq \frac{c}{4r_{max}} \quad (14)$$

In this embodiment, two transmission frequencies are used to obtain a distance from a phase difference obtained at the two frequencies. In this case, the process is performed supposing that one target is contained in the received signal $S_{R+}$. If a plurality of targets is supposed to be contained in the received signal $S_{R+}$, a distance calculating method using three or more transmission frequencies may be used. For example, as described in "Multiple Target Detection using Stepped Multiple Frequency Interrupted CW Radar" by Takayuki Inaba, the IEICE transactions B, Vol. J.89-B, No. 3, pp. 373 to 383, 2006, for the observation with three or more transmission frequencies, a signal train is created in the transmission frequency direction. By performing spectrum analysis (for example, MUSIC processing) on the signal train, the distance calculating process can be performed for a plurality of targets.

As a method of detecting the spectral peak, a method of detecting the maximum value of the spectrum has been described above. When the signal component can be regarded as a line spectrum, even such a simple method does not cause any problem. However, if a target speed has fluctuations or the hardware of the radar device is unstable, the spectral peak ranges. If receiver noise is superimposed on such a spectrum, there is a possibility that a plurality of small maximum values appear in a single spectral peak. In such a case, the use of a technique such as a Moment method, for example, as disclosed in "3.1.2 Estimators of Spectral Moments" by H. Sauvageot in Radar Meteorology, Artech House, 1992, allows a center frequency of the ranging spectral peak to be appropriately calculated.

As described above, since the radar device according to the first embodiment can correctly measure the Doppler frequency with the correct sign even when the receiver is provided only for the real component. Therefore, the number of components is reduced as compared with the use of the I/Q detection method requiring two receivers, that is, one for the real component and the other for the imaginary component. Accordingly, the radar device of this embodiment has an advantage in reducing cost.

Second Embodiment

In the first embodiment described above, the peaks are detected in both the positive Doppler frequency and the negative Doppler frequency. Only when the result of the calculation of a distance is a positive value, the measured distance value and the Doppler frequency are output. This second embodiment discusses a configuration of a radar device for detecting a peak in any of the positive Doppler frequency domain and the negative Doppler frequency domain. Then, based on the result of the sign of the calculated distance, the sign of the Doppler frequency is corrected.

Figure 3:
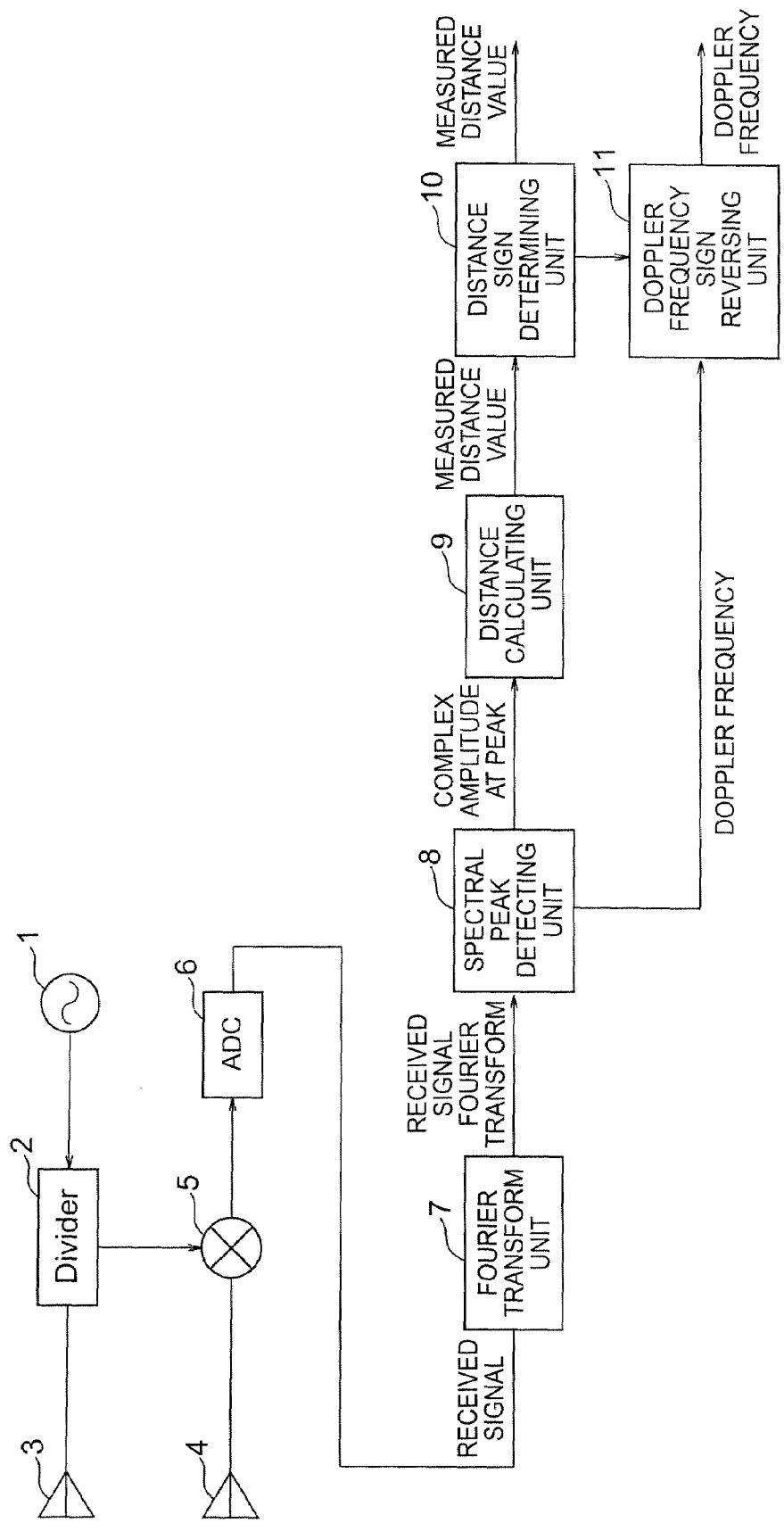
FIG. 3 is a block diagram illustrating a configuration of a radar device according to a second embodiment of the present invention.

FIG. 3 is a block diagram illustrating a configuration of a radar device according to the second embodiment of the present invention. In the configuration illustrated in FIG. 3 according to the second embodiment, the same components as those in the first embodiment shown in FIG. 1 are denoted by the same reference numerals, and the description thereof will be omitted. In contrast with the configuration illustrated in FIG. 1 according to the first embodiment, the configuration illustrated in FIG. 3 according to the second embodiment is additionally provided with a Doppler frequency sign reversing unit 11 in addition to the distance sign determining unit 10 as the distance determining unit. The Doppler frequency sign reversing unit 11 reverses the sign of the Doppler frequency obtained in the spectral peak detecting unit 8 when the measured distance value is determined as negative in the distance sign determining unit 10.

Specifically, in the second embodiment, the distance determining unit consists of the distance sign determining unit 10 and the Doppler frequency sign reversing unit 11. The distance sign determining unit 10 determines whether the measured distance value calculated in the distance calculating unit 9 is positive or negative and outputs the measured distance value obtained in the distance calculating unit 9. The Doppler frequency sign reversing unit 11 reverses the sign of the Doppler frequency, at which the peak complex signal value obtained in the spectral peak detecting unit 8 is extracted, when the measured distance value calculated in the distance calculating unit 9 is determined as negative by the distance sign determining unit 10, and then outputs the Doppler frequency with the reversed sign.

Next, an operation of the radar device according to the second embodiment will be described. The operation from the generation of the transmission wave in the oscillator 1 to the Fourier transform performed in the Fourier transform unit 7 is the same as that in the first embodiment described above. However, an amplitude distribution of the received signal Fourier transform obtained from the Fourier transform unit 7 becomes symmetrical about the Doppler frequency of 0. Therefore, the peak detecting process in the spectral peak detecting unit 8 is conducted only in the domain where the Doppler frequency is positive.

When a true value of the Doppler frequency is positive, the measured distance value obtained in the distance calculating unit 9 is positive, that is, a correct value. On the contrary, when the true value of the Doppler frequency is negative, the measured distance value obtained in the distance calculating unit 9 is negative. However, since the result of the measured distance is incorrect merely in its sign, the absolute value is output as the measured distance value. The negative measured distance value obtained in the distance calculating unit 9 means that the sign of the detected Doppler frequency is opposite, i.e., incorrect. However, the absolute value of the Doppler frequency is correct. Therefore, when the sign of the distance, which is input to the distance sign determining unit 10, is negative, the Doppler frequency sign reversing unit 11 reverses the sign of the Doppler frequency input from the spectral peak detecting unit 8 to negative and then outputs the Doppler frequency with the reversed sign. On the other hand, when the sign of the distance is positive, the Doppler frequency input from the spectral peak detecting unit 8 is directly output because the correct Doppler frequency is obtained.

Figure 4:
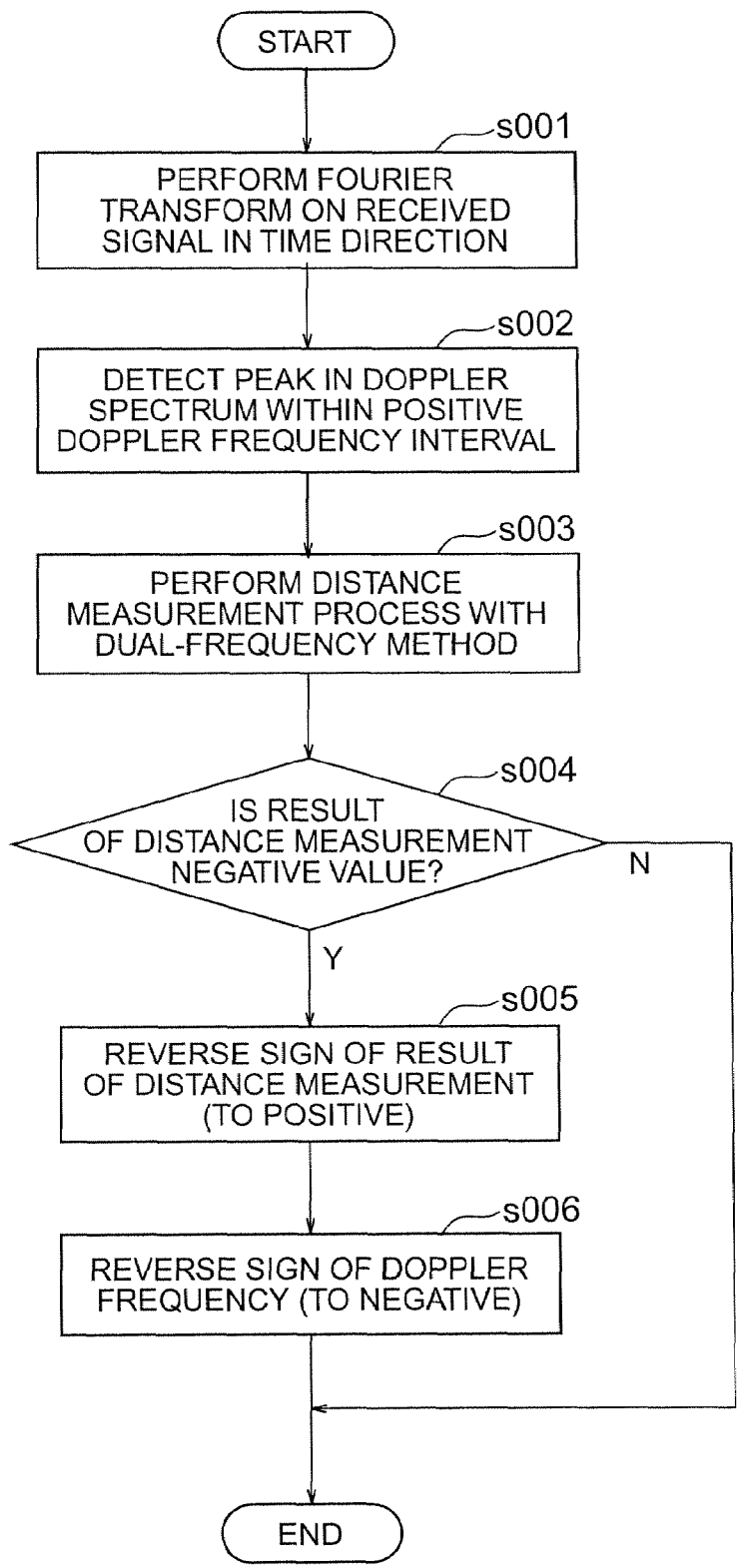
FIG. 4 is a flowchart illustrating an operation procedure of the radar device according to the second embodiment of the present invention.

FIG. 4 illustrates the above operation in the form of a flowchart. In Step S001, the Fourier transform is performed on the received signal in the Fourier transform unit 7. In Step S002, a spectral peak is detected in the spectral peak detecting unit 8. However, the spectral peak detecting process is performed only for a frequency interval in which the Doppler frequency is positive. In Step S003, the distance is calculated (a distance measurement process is performed) by using the result of observation with the dual-frequency method with Formula (11) in the distance calculating unit 9. In Step S004, the sign of the measured distance value obtained in Step S003 is determined by the distance sign determining unit 10. If the sign of the measured distance value is negative, the operation proceeds to Step S005. In Step S005, the sign of the result of distance measurement is reversed to positive. In Step S006, the sign of the Doppler frequency is reversed in the Doppler frequency sign reversing unit 11.

As described above, in this second embodiment, the interval of the Doppler frequency, which corresponds to a target of the spectral peak detection, is halved. Therefore, in addition to the effects of the first embodiment, the second embodiment provides the effect of reducing the amount of calculation.

Third Embodiment

In the first embodiment described above, an example of the configuration of the radar device applicable to the use of a continuous wave as the transmission wave has been described. An embodiment of the radar device, in which the transmission wave is subjected to pulse modulation, will now be described.

Figure 5:
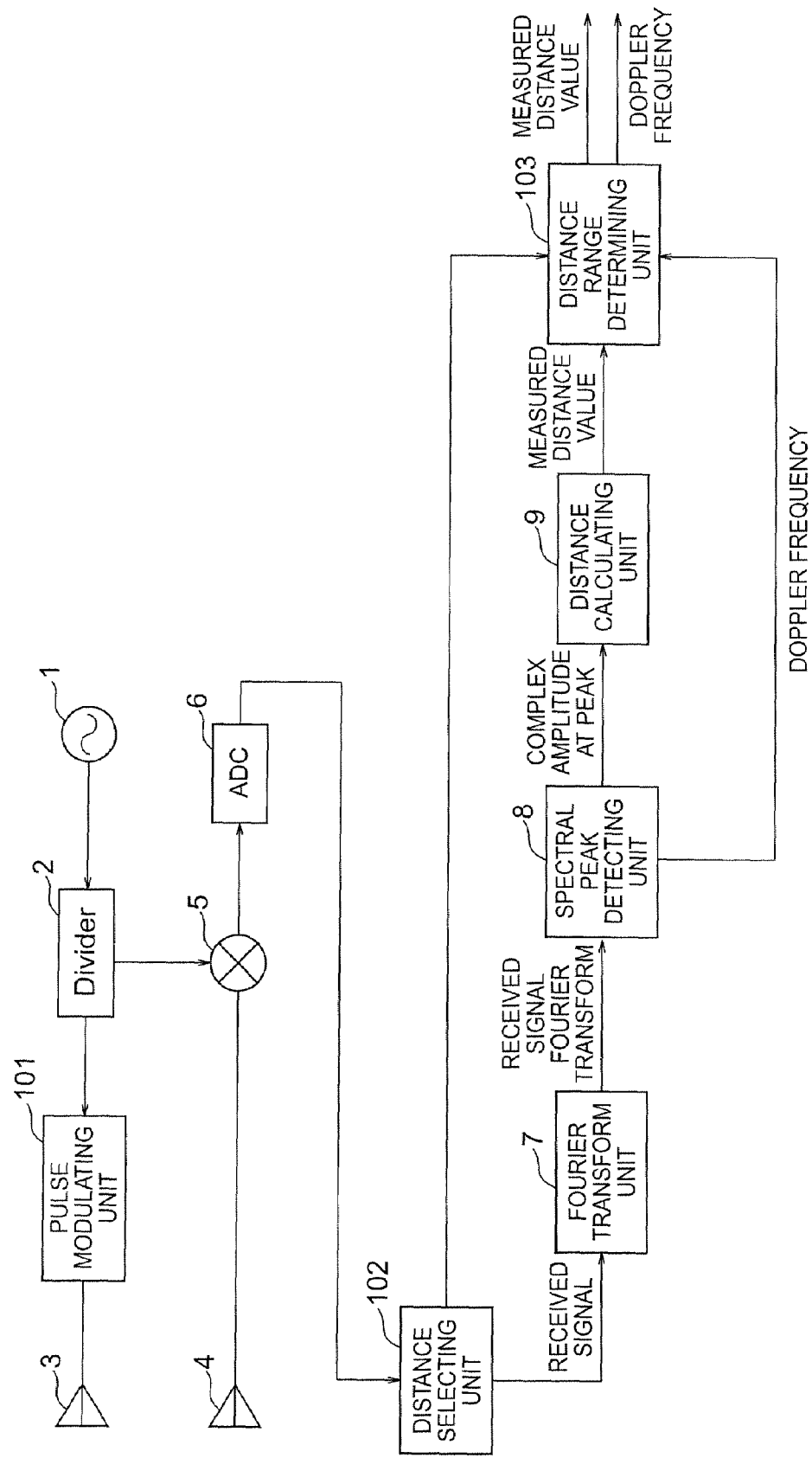
FIG. 5 is a block diagram illustrating a configuration of a radar device according to a third embodiment of the present invention.

FIG. 5 is a block diagram illustrating a configuration of a radar device according to the third embodiment of the present invention. In the configuration illustrated in FIG. 5 according to the third embodiment, the same components as those of the configuration illustrated in FIG. 1 according to the first embodiment are denoted by the same reference numerals, and the description thereof will be omitted. In contrast with the configuration illustrated in FIG. 1 according to the first embodiment, the third embodiment illustrated in FIG. 5 further includes a pulse modulating unit 101, a distance selecting unit 102, and a distance range determining unit 103 serving as the distance determining unit. The pulse modulating unit 101 performs pulse modulation on the transmission wave output from the oscillator 1. The distance selecting unit 102 extracts only the digital received signals sampled at a predetermined difference between a transmission time and a reception time from the digital received signals obtained in the A/D converter 6, in other words, selects the digital received signals having the same difference between the transmission time and the reception time, to output only the received signals corresponding to the received wave reflected at a specific distance and to output a distance estimate corresponding to the difference between the transmission time and the reception time. The distance range determining unit 103 compares the measured distance value calculated in the distance calculating unit 9 and the distance estimate to be selected in the distance selecting unit 102 to output the measured distance value and the Doppler frequency only when a difference obtained as the result of comparison is equal to or smaller than a predetermined value.

Next, an operation of the radar device according to the third embodiment will be described. The oscillator 1 generates a continuous transmission wave. The pulse modulating unit 101 performs pulse modulation on the transmission wave. The transmission frequency of the transmission wave output from the oscillator 1 is switched between multiple patterns on the time-division basis. Herein, for simplification, the transmission frequency is alternately switched between two patterns.

The transmission wave generated in the oscillator 1 is input to the divider 2. The divider 2 divides the transmission wave into multiple (two) transmission waves and then outputs the obtained transmission waves. One of the transmission wave outputs obtained by the division is output to the receiver 5 as a local wave. The other transmission wave output obtained by the division is subjected to pulse modulation in the pulse modulating unit 101, and then is emitted from the transmitting antenna 3 into space. The emitted transmission wave is reflected by the reflecting object present in the space. A part of the resultant reflected wave returns to the position of the radar device. The reflected wave reaching the position of the radar device is captured by the receiving antenna 4 into the radar device as a received wave.

In this third embodiment, the emission of the transmission wave and the capture of the received wave are performed at different times because the transmission wave is subjected to pulse modulation. Therefore, a single antenna may be used in a time-divisional manner so as to realize the transmitting antenna and the receiving antenna by the single antenna.

The receiver 5 mixes the received wave and the transmission wave to generate a received signal having a frequency corresponding to a difference between the two waves (difference frequency). The difference frequency is equal to a Doppler frequency of the reflecting object. The receiver 5 outputs the received signal generated at each of the transmission frequencies to the A/D converter 6. The A/D converter 6 performs analog-to-digital conversion on the input received signal to generate the resultant digital received signal.

In this third embodiment, the transmission wave is subjected to pulse modulation. Therefore, a time difference between the transmission and the reception, that is, a delay time of the received signal is proportional to the distance to the reflecting object. Thus, based on the delay time of the pulsed received signal (received pulse), the distance to the reflecting object can be obtained. By setting a sampling period of the A/D converter 6 to substantially the same level as a pulse width, the received signal separated for each distance resolution determined by the pulse width can be obtained.

The distance selecting unit 102 selects only the digital received signal, which is obtained within the delay time corresponding to a distance of interest, from those sampled in the A/D converter 6. As a result, only the receiver signal corresponding to the reflecting object present within a distance interval determined by the pulse width is selected. Signal processing can be conducted for an arbitrary distance interval by changing a distance interval to be selected and then performing the processing in the subsequent steps for each time. The selected received signal is output to the Fourier transform unit 7. The selected distance interval is output to the distance range determining unit 103.

The Fourier transform unit 7 performs the Fourier transform on the received signal selected by the distance selecting unit 102 to calculate the received signal Fourier transform. Furthermore, as in the operation according to the first embodiment described above, the spectral peak detecting unit 8 extracts the complex amplitudes of the Doppler frequency at which the amplitude of the received signal Fourier transform has the maximum value. Then, the distance is calculated in the distance calculating unit 9. By this step, the operation is the same as that described in the first embodiment. However, this third embodiment differs from the first embodiment in that the received signal used for calculating the distance corresponds only to the distance interval (distance measurement target interval) set in the distance selecting unit.

The distance calculation is obtained in the distance calculating unit 9 from a phase difference between the complex amplitudes obtained through the observation with a plurality of transmission frequencies. The phase difference is proportional to the distance. However, the phase difference which can be measured without ambiguity in sign is only within an interval having an interval length of $2\pi$. In the first embodiment described above, by assigning an interval of $-\pi$ to 0 to a positive distance and an interval of 0 to $\pi$ to a negative distance, it is determined based on the negative distance that the sign of the Doppler frequency is not true, i.e., is incorrect. Since the situation satisfying the conditions defined by Formula (14) is premised in the first embodiment, it can be believed that a target is not present at a distance longer than the distance corresponding to the phase difference of $\pi$.

However, for example, when the reflected wave from the reflecting object present at a distance corresponding to the phase difference of $-1.5\pi$ can be received, the phase difference cannot be distinguished from the phase difference of $0.5\pi$. Therefore, it cannot be determined based merely on the sign of the distance whether the sign of the Doppler frequency is correct or incorrect.

In this third embodiment, the transmission wave is subjected to pulse modulation. Therefore, as described above, the distance interval of the received signal to be extracted can be limited in the distance selecting unit 102. Therefore, the comparison between the distance interval set in the distance selecting unit 102 and the result of distance measurement in the distance calculating unit 9 allows the determination of validity of the measured distance value.

Specifically, the distance range determining unit 103 operates so as to determine the validity of the measured distance value to determine the sign of the Doppler frequency in the following manner. The distance calculating unit 9 can obtain the result of distance measurement for two cases, that is, the case where the Doppler frequency is positive and the case where the Doppler frequency is negative. The distance range determining unit 103 can determine that the result of distance measurement obtained within the distance interval set in the distance selecting unit 102 is being obtained by using the correct Doppler frequency component. Therefore, only when the correct result of distance measurement is obtained, the measured distance value and the Doppler frequency are output.

Figure 6:
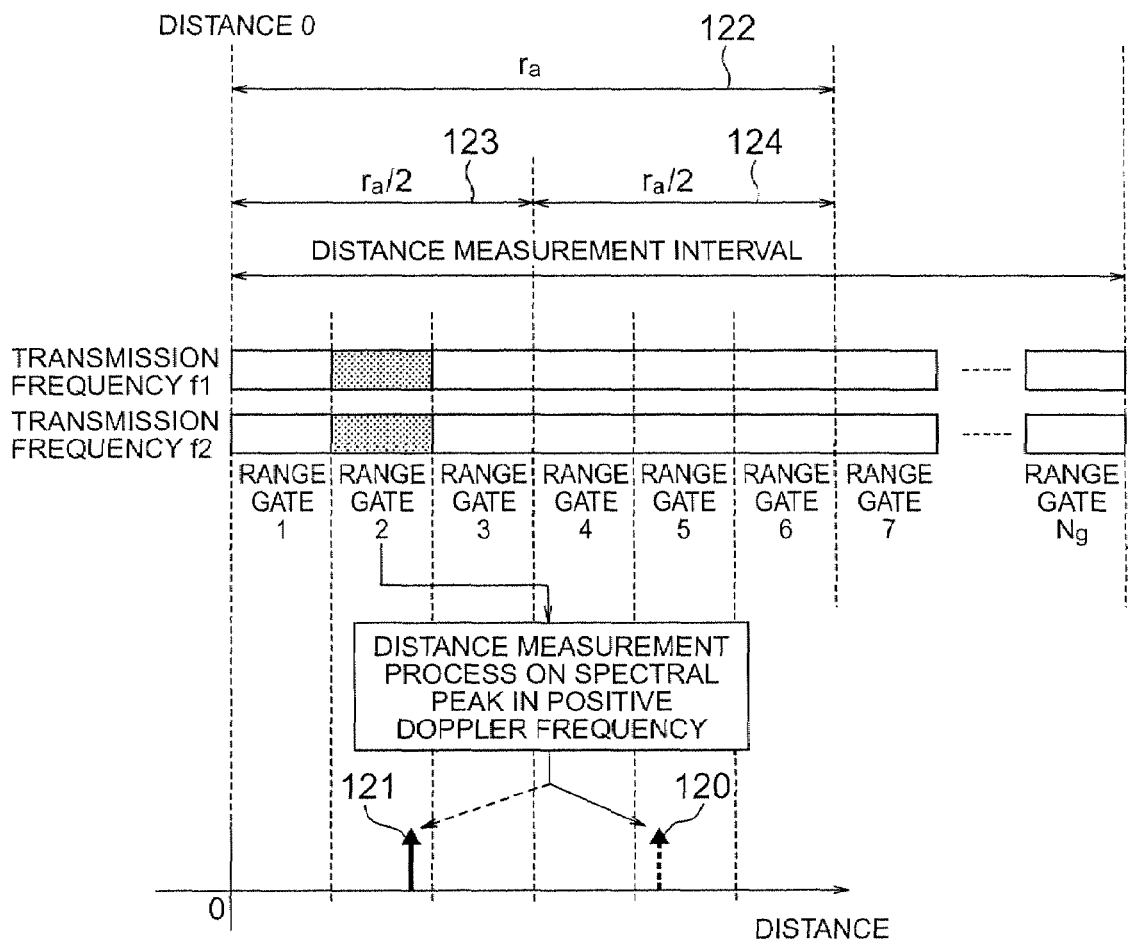
FIG. 6 is a view illustrating the principle of the radar device according to the third embodiment of the present invention.

FIG. 6 is a schematic view illustrating the above principle. In the radar device supposed in FIG. 6, a phase difference of 0 to $-\pi$ is assigned to an interval which covers range gates 1 to 3 (an interval 123), whereas a phase difference of $-\pi$ to $+2\pi$ is assigned to an interval which covers range gates 4 to 6 (an interval 124).

At each of the transmission frequencies f1 and f2, it is assumed that a peak of the Doppler spectrum is detected at the range gate 2. The Doppler spectrum has a symmetrical shape for the positive and negative Doppler frequencies. Herein, it is supposed that a peak is detected in the interval of the positive Doppler frequency. When the measured distance value obtained by extracting the respective complex amplitudes of the peaks in both the transmission frequencies f1 and f2 and then performing the processing as expressed by Formula (11) is obtained as a distance 121 illustrated in FIG. 6, it can be determined that the result of distance measurement is correct because the measured distance value is obtained in the range gate 2 included in the distance measurement target interval. Specifically, when the result of distance measurement is obtained in the range gate in which the peak is detected, the sign of the Doppler frequency as well as the measured distance value remain unchanged.

On the other hand, when the result of distance measurement is obtained as a distance 120, the result of distance measurement is out of the range gate 2 included in the distance measurement target interval. Therefore, it can be determined that the result of distance measurement is incorrect. Since the correct result of distance measurement can be obtained by the processing using the complex amplitude value obtained by the detection of a peak obtained within the negative Doppler frequency interval, the erroneous result of distance measurement may be discarded. Specifically, when the result of distance measurement is obtained out of the range gate in which the peak is detected, the sign of the Doppler frequency can be believed to be incorrect.

In an interval with the distance resolution $\Delta r$ determined by the pulse width, if radar characteristics do not produce any ambiguity in the calculation of the distance performed in the distance calculating unit 9, that is, the measured distance value calculated from the positive Doppler frequency component and that calculated from the negative Doppler frequency component do not fall within the interval having the same value of $\Delta r$, the sign of the Doppler frequency can be determined. In this case, $\Delta f$ is set so as to satisfy the following Formula (15).

[Formula 15]

$$\Delta f \le \frac{c}{2\Delta r} \quad (15)$$

By adjusting $\Delta f$, a distance interval length assigned to the phase difference interval of $2\pi$ can be set smaller. Therefore, since a distance error corresponding to the same phase error can be reduced, distance calculation accuracy in the distance calculating unit 9 can be improved.

As described above, according to the radar device of this third embodiment, even when the receiver has a low-cost device configuration which generates only real signals, the distance can be measured without ambiguity in the sign of the target Doppler frequency. More specifically, it can be correctly measured whether the target is approaching or receding.

Fourth Embodiment

In the third embodiment described above, distance results r1 and r2 denoted by the reference numerals 121 and 120 in FIG. 6 appear in a symmetrical positional relation with respect to the center of a distance interval $r_a$. Therefore, even when the distance is measured with the signal component of the Doppler frequency with the incorrect sign, the result of distance measurement can be corrected by using the symmetry. The embodiment for performing such a correction will be described.

Figure 7:
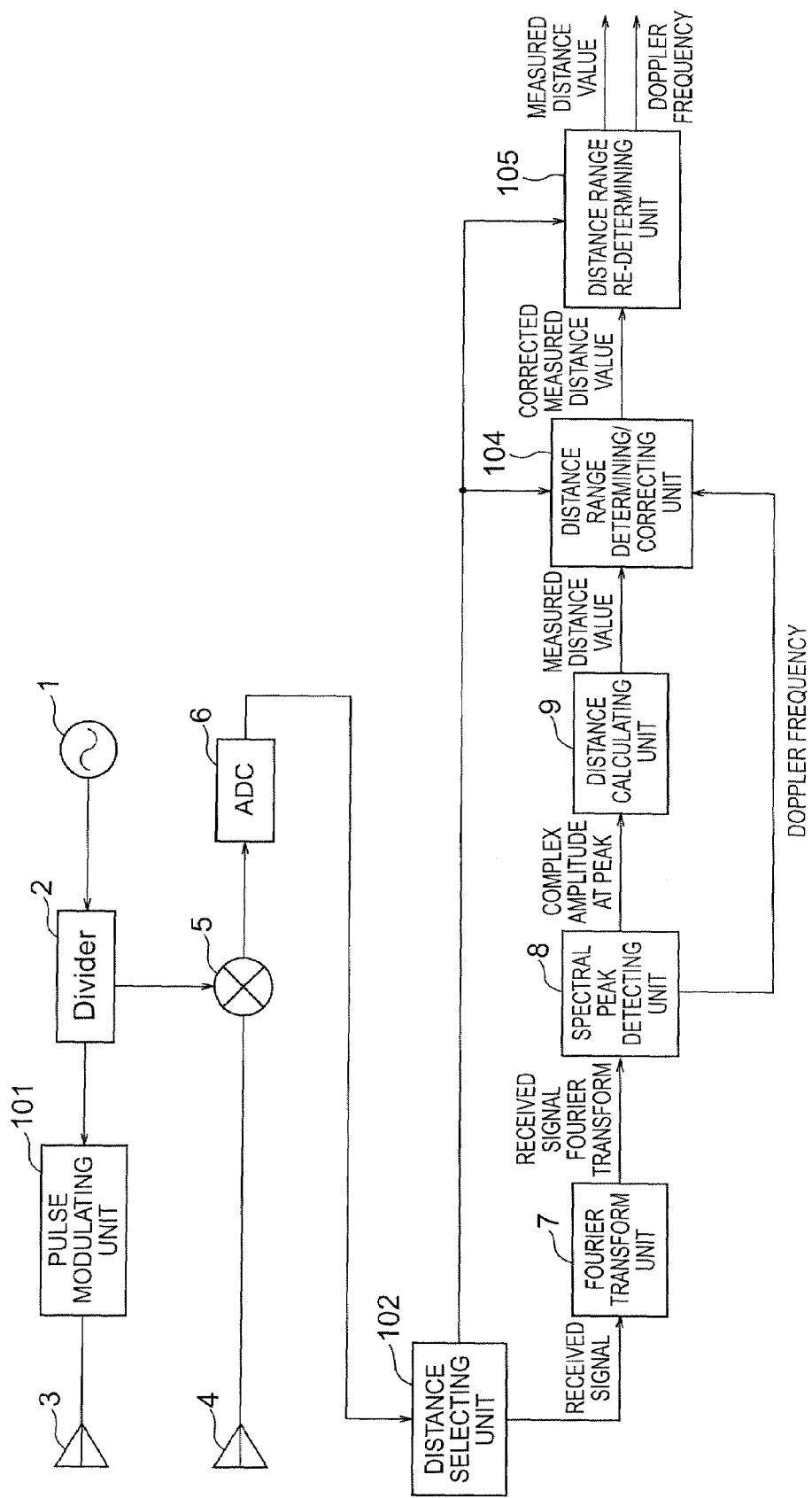
FIG. 7 is a block diagram illustrating a configuration of a radar device according to a fourth embodiment of the present invention.

FIG. 7 is a block diagram illustrating a configuration of a radar device according to a fourth embodiment of the present invention. The same components of the configuration shown in FIG. 7 according to the fourth embodiment as those of the configuration shown in FIG. 5 according to the third embodiment are denoted by the same reference numerals, and the description thereof is herein omitted. In contrast with the configuration shown in FIG. 5 according to the third embodiment, the configuration shown in FIG. 7 according to the fourth embodiment includes a distance determining/correcting unit 104 and a distance range re-determining unit 105 in place of the distance range determining unit 103 as the distance determining unit. The distance determining/correcting unit 104 compares the distance estimate obtained in the distance selecting unit 102 and the measured distance value calculated in the distance calculation unit 9 with each other, corrects the measured distance value assuming that the sign of the Doppler frequency is reversed when a difference obtained by the comparison is equal to or larger than a predetermined value (the two values are far from each other), and output a corrected measured distance value. The distance range re-determining unit 105 compares the corrected measured distance value obtained in the distance determination correcting unit 104 and the distance estimate with each other and outputs the corrected measured distance value and a sign-reversed Doppler frequency obtained by reversing the sign of the Doppler frequency as the Doppler frequency only when a difference obtained by the comparison is equal to or smaller than the predetermined value (the two values are close to each other).

The distance range determining/correcting unit 104 first verifies whether or not the measured distance value falls within the distance measurement target interval, as in the case of the distance range determining unit 103 shown in FIG. 5. If the measured distance value falls within the distance measurement target interval, the measured distance value and the Doppler frequency are output. On the other hand, if the measured distance value does not fall within the distance measurement target interval, the sign of the Doppler frequency is assumed to be incorrect to correct the measured distance value. Specifically, after a correction process for the phase difference calculated within the range of 0 to $-2\pi$, the corrected measured distance value is calculated. Values of the phase differences before and after the correction (hereinafter, referred to respectively as the "pre-correction phase difference" and the "post-correction phase difference") are positioned symmetrically with respect to $-\pi$. Therefore, the post-correction phase difference is obtained by subtracting the pre-correction phase difference from $-2\pi$. By using the thus obtained post-correction phase difference, the measured distance value is calculated. This process will be described as follows in terms of the measured distance value. In the example illustrated in FIG. 6, for example, a shift of the measured distance value to the position symmetrical in distance about the boundary between the range gates 3 and 4 corresponds to the process of correcting the distance.

The distance range re-determining unit 105 determines whether or not the corrected measured distance value falls within the distance measurement target interval. If the measured distance value falls within the distance measurement target interval, it is appropriate to regard the corrected measured distance value as correct. However, when the measured distance value is obtained out of the distance measurement target interval, the measured distance value is not output because the correct measured distance value is not obtained. For example, when the distance is measured by using the peak of the Doppler spectrum, which is erroneously detected due to the effect of thermal noise or the like, the situation where the correct measured distance value cannot be obtained occurs.

Figure 8:
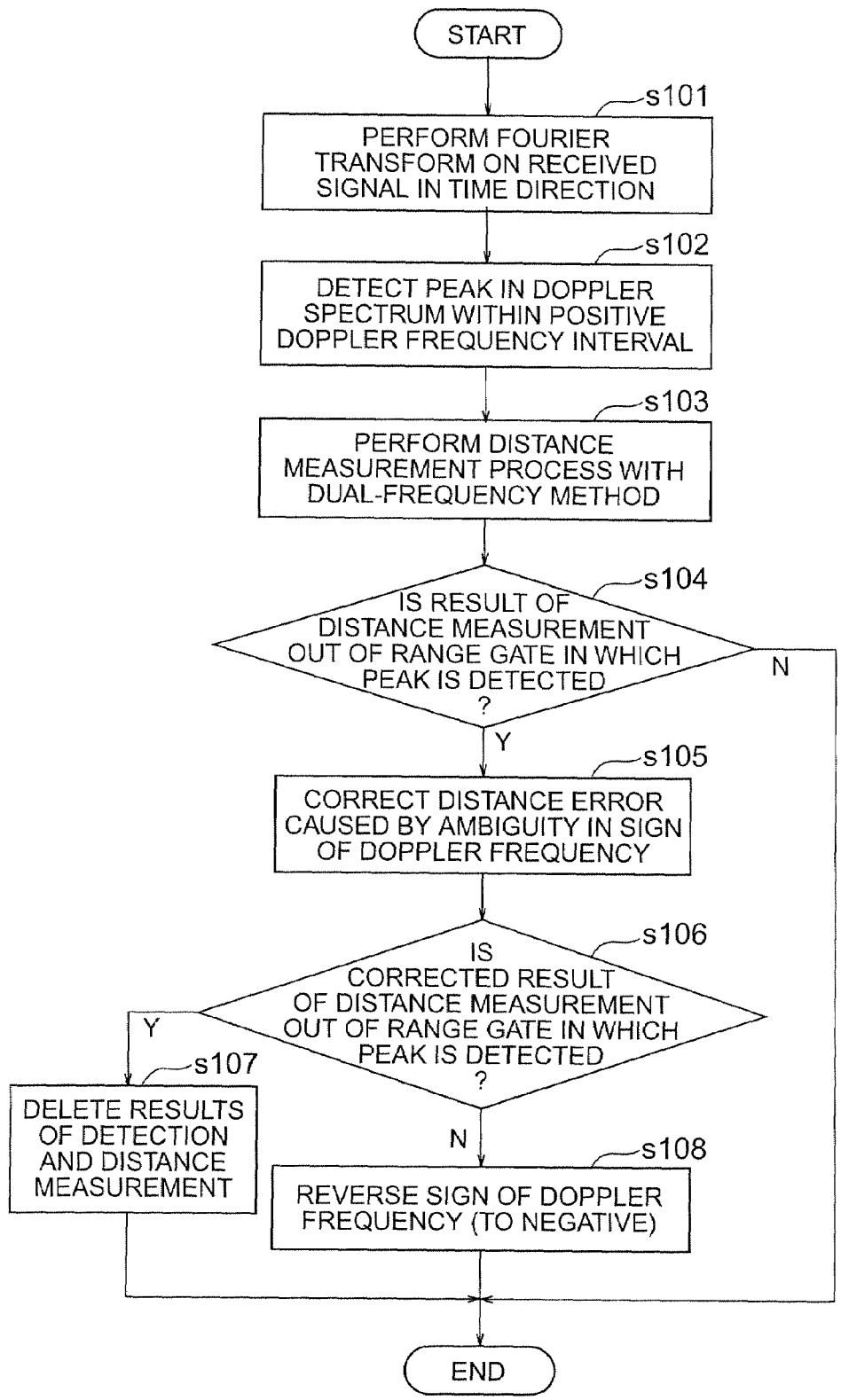
FIG. 8 is a flowchart illustrating an operation procedure of the radar device according to the fourth embodiment of the present invention.

FIG. 8 is a flowchart illustrating an operation procedure of the radar device according to the fourth embodiment. In Step S101, the Fourier transform unit 7 performs the Fourier transform on the received signal. In Step S102, the spectral peak detecting unit 8 detects a spectral peak. The spectral peak detecting process is performed only for the domain of the positive Doppler frequency. In Step S103, the distance calculating unit 9 uses the result of the observation with the dual-frequency method to calculate the distance (perform the distance measurement process) using Formula (11).

In Step S104, the measured distance value obtained in Step S103 is compared with the distance measurement target interval. If the measured distance value falls within the distance measurement target interval, specifically, in the range gate where the peak is detected, the process is terminated because it is considered that the correct result of distance measurement is obtained. On the other hand, if the obtained measured distance value is out of the distance measurement target interval, the process proceeds to Step S105. In Step S105, assuming that the sign of the Doppler frequency is incorrect, the distance range determining/correcting unit 104 corrects the measured distance value.

In Step S106, the corrected measured distance value and the distance interval set in the distance setting unit 102 are compared with each other. If a difference obtained by the comparison is equal to or less than a predetermined value, the process proceeds to Step S108. If not, the process proceeds to Step S107. In Step S107, the measured distance value even after the correction is regarded as being still incorrect. Therefore, the results of detection and distance measurement are deleted. In Step S108, the corrected measured distance value is regarded as correct to reverse the sign of the Doppler frequency.

As described above, according to the fourth embodiment, as in the third embodiment described above, the effects that the distance accuracy is improved in the radar device which performs the pulse modulation are obtained. Furthermore, since the measured distance value obtained when the sign of the Doppler frequency is incorrect is corrected, the Doppler frequency interval corresponding to the target of the spectral peak detecting process is limited to any of the positive and negative frequency domains. Thus, the effects of reducing the amount of calculation in the signal processing are obtained.

Fifth Embodiment

The third or fourth embodiment described above supposes an ideal operation of the pulse modulating unit 101, specifically, the transmission wave is scarcely output in a transmission wave OFF state. In practice, for the restrictions in terms of performance of the pulse modulating unit 101, the transmission wave generally leaks at a low power level even during an output OFF time. An embodiment applicable even to the case where the power level of the transmission wave leakage is unignorably high will be described.

Figure 9:
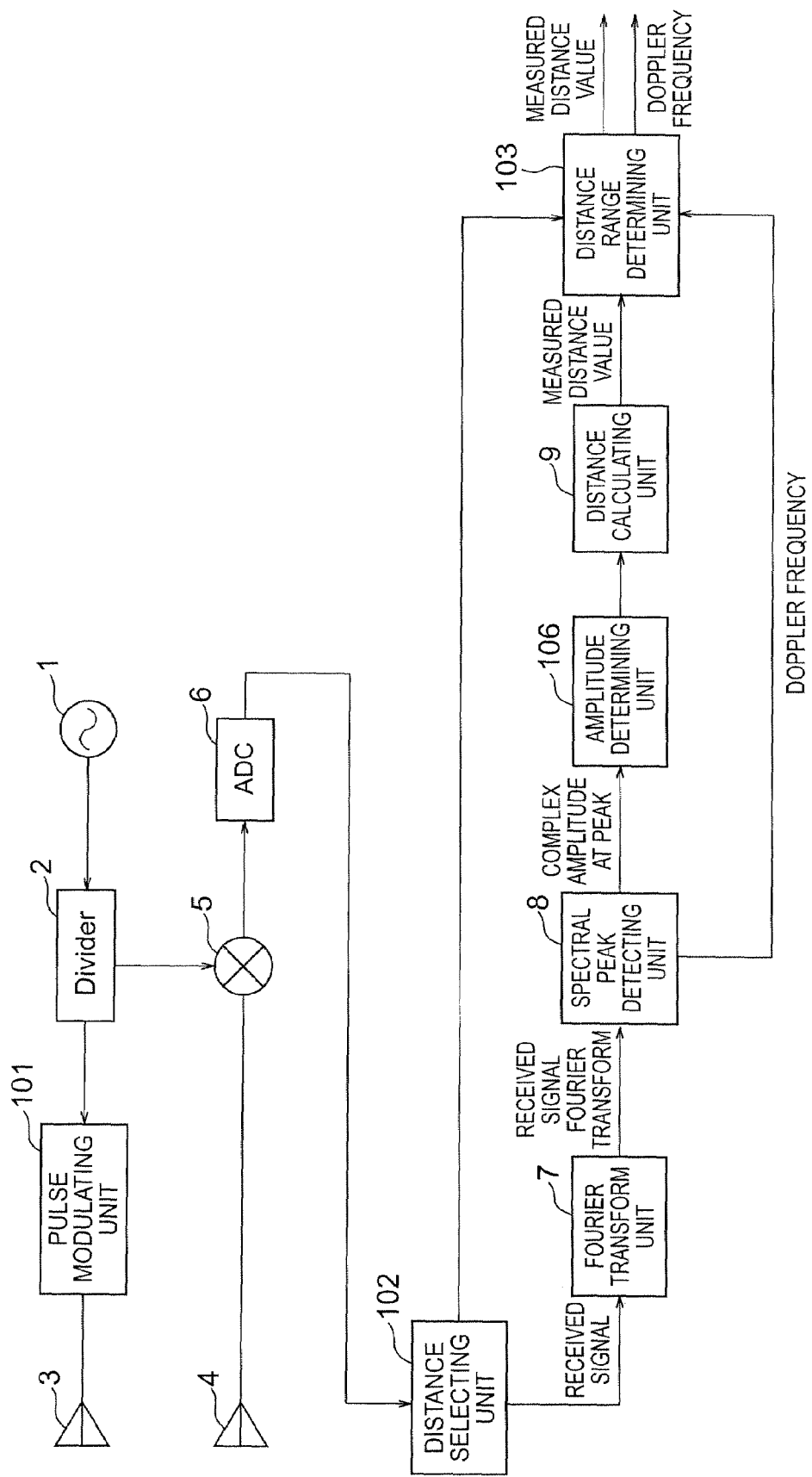
FIG. 9 is a block diagram illustrating a configuration of a radar device according to a fifth embodiment of the present invention.

FIG. 9 is a block diagram illustrating a configuration of the radar device according to the fifth embodiment of the present invention. The same components in the configuration illustrated in FIG. 9 according to the fifth embodiment as those of the configuration illustrated in FIG. 5 according to the third embodiment are denoted by the same reference numerals, and the description thereof is herein omitted. In contrast with the configuration illustrated in FIG. 5 according to third embodiment, the fifth embodiment illustrated in FIG. 9 further includes an amplitude determining unit 106 between the spectral peak detecting unit 8 and the distance calculating unit 9. The amplitude determining unit 106 compares a ratio of an amplitude value having the difference between the transmission time and the reception time at which the maximum amplitude value is obtained and another amplitude value, when multiple peak complex signal values are obtained from the same Doppler frequency in the received signal Fourier transform obtained from the received signal samples obtained by sampling the received signal at different differences between the transmission time and the reception time, and deletes the peak complex signal value at the difference between the transmission time and the reception time at which the amplitude value whose ratio is smaller than the predetermined reference is obtained.

Specifically, in the radar device according to the fifth embodiment, the transmission wave is output at a low power level even while the transmission OFF is being instructed in the pulse modulating unit 101. Therefore, when the peak complex signal value is obtained from the same Doppler frequency in the received signal Fourier transform obtained from the received signal samples obtained by sampling the received signal at different differences between the transmission time and the reception time, an amplitude value of the peak complex signal value is compared with the amplitude value at the difference between the transmission time and the reception time at which the maximum amplitude value is obtained. The peak complex signal value at the difference between the transmission time and the reception time, at which the amplitude value smaller than a predetermined reference is obtained, is deleted.

Figure 10:
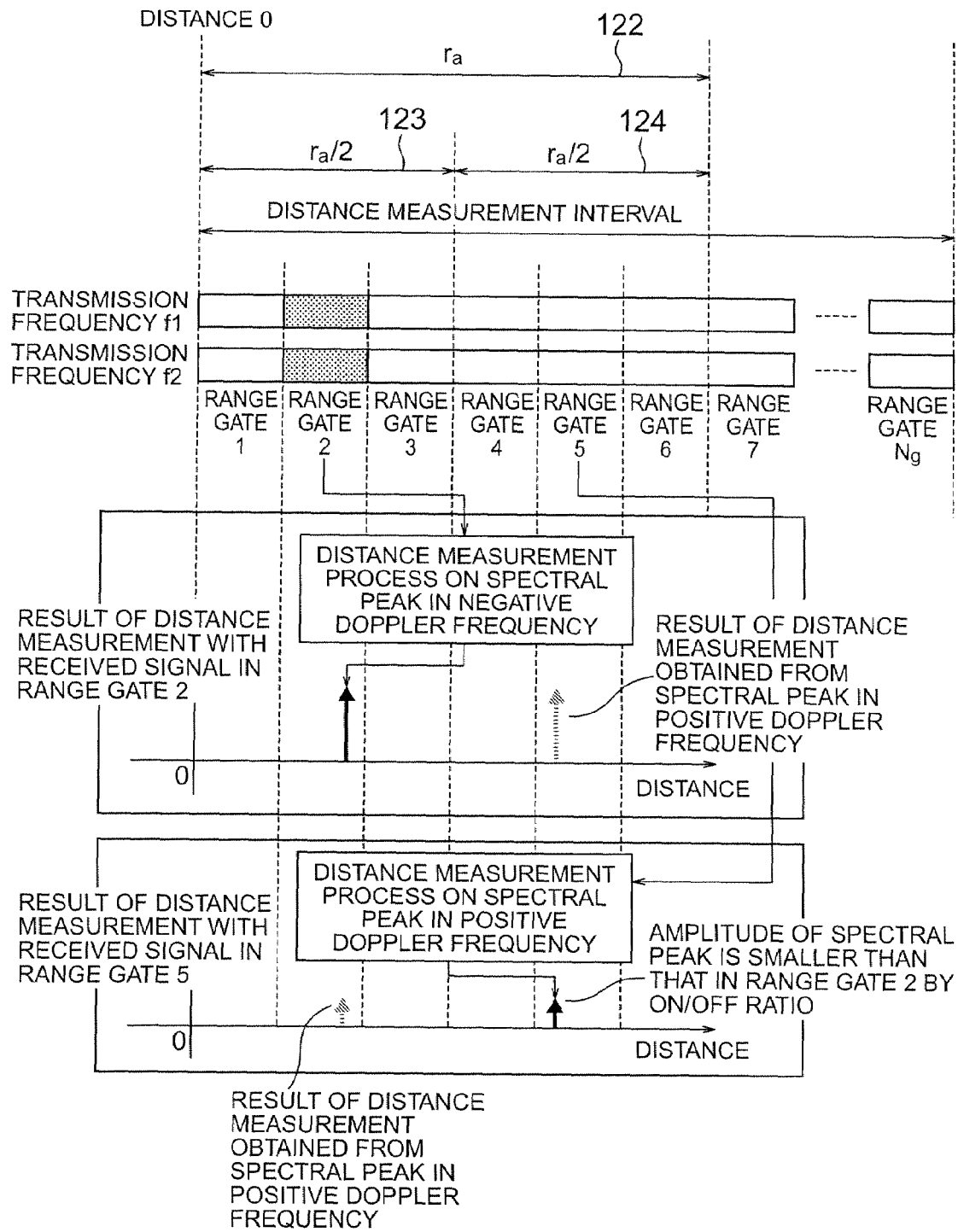
FIG. 10 is a view illustrating the principle of the radar device according to the fifth embodiment of the present invention.

FIG. 10 illustrates the principle of the radar device according to the fifth embodiment. FIG. 10 is similar to FIG. 6 referred to in the third embodiment. FIG. 10 illustrates, however, the situation where the signal is also received in the range gates other than the range gate 2 because the transmission OFF state in the pulse modulating unit 101 is not complete. If the transmission OFF state in the pulse modulating unit 101 is complete, the received signal is detected only when the range gate 2 is selected in the distance selecting unit 102. In the radar device according to the fifth embodiment, the received signal is also detected in the other range gates.

When the received signal detected in the range gate 5 is used to calculate the distance in the distance calculating unit 9, the measured distance values are obtained within the interval of the range gate 2 and that of the range gate 5, respectively. The measured distance value obtained within the interval of the range gate 2 is correct, however, the measure distance value obtained within the interval of the range gate 5 is erroneously determined as correct because the received signal is also detected in the range gate 5. As a result, the incorrect result of distance measurement is output. In addition, the Doppler frequency with the incorrect sign is output.

However, in view of the result of detection obtained when the range gate 2 is selected in the distance selecting unit 102, the possibility of obtaining the incorrect result of distance measurement in the case where the range gate 5 is selected in the distance selecting unit 102 can be easily understood. Specifically, in the distance calculating process for the case where the range gate 2 is selected in the distance selecting unit 102, a false measured distance value is obtained within the interval of the range gate 5. The same measured distance value is also obtained in the case where the range gate 5 is selected in the distance selecting unit 102. However, for the amplitude of the received signal in the case where the range gate 5 is selected in the distance selecting unit 102, a power value is satisfactorily smaller than in the case of the selection of the range gate 2. This is because the power for leakage of the transmission wave during a transmission OFF time is apparently smaller than that transmitted in a transmission ON time although the transmission OFF is incomplete.

Therefore, when the measured distance value is obtained within the interval of the range gate 5 for the selection of the range gate 5, it is checked whether or not the same measured distance value is obtained as a false measured distance value for the case of the selection of another range gate. If the same measured distance value is obtained even when another range gate is selected, the amplitude of the received signal for the calculation of the measured distance value is compared with that of the received signal for the selection of the range gate 5. If the amplitude of the received signal for the selection of another range gate is larger than that of the received signal for the selection of the range gate 5, there is a possibility that the measured distance value with the selection of the range gate 5 may be false. Therefore, the result may be eliminated.

More specifically, in FIG. 10, the negative Doppler frequency is obtained in the range gate 2, whereas the positive Doppler frequency is obtained in the range gate 5. Both of the Doppler frequencies can be considered to be available for the distance measurement. As a countermeasure against such a case, a spectral peak having a larger amplitude is used to perform the distance measurement process when the spectral peaks in the same Doppler frequency are obtained in a plurality of range gates.

A configuration illustrated in FIG. 9 is obtained by providing the amplitude determining unit 106 between the spectral peak detecting unit 8 and the distance calculating unit 9 in the configuration illustrated in FIG. 5 according to the third embodiment. The present invention is carried out in the same manner by providing the amplitude determining unit 106 between the spectral peak detecting unit 8 and the distance calculating unit 9 in the configuration illustrated in FIG. 7 according to the fourth embodiment. With this configuration, the same effects can be obtained.

According to the fifth embodiment, even if the performance of the pulse modulating unit 101 is not satisfactory, the sign of the Doppler frequency can be correctly determined. Therefore, the fifth embodiment is advantageous in that a low-cost component can be used as the pulse modulating unit 101.

Sixth Embodiment

In the first to fifth embodiments described above, only one receiving antenna 4 is provided. In this sixth embodiment, a receiving antenna is composed of a plurality of receiving elements to synthesize received beams through signal processing. In this sixth embodiment, a problem of ambiguity in the sign in angle measurement is solved in addition to ambiguity in the sign of the Doppler frequency.

Figure 11:
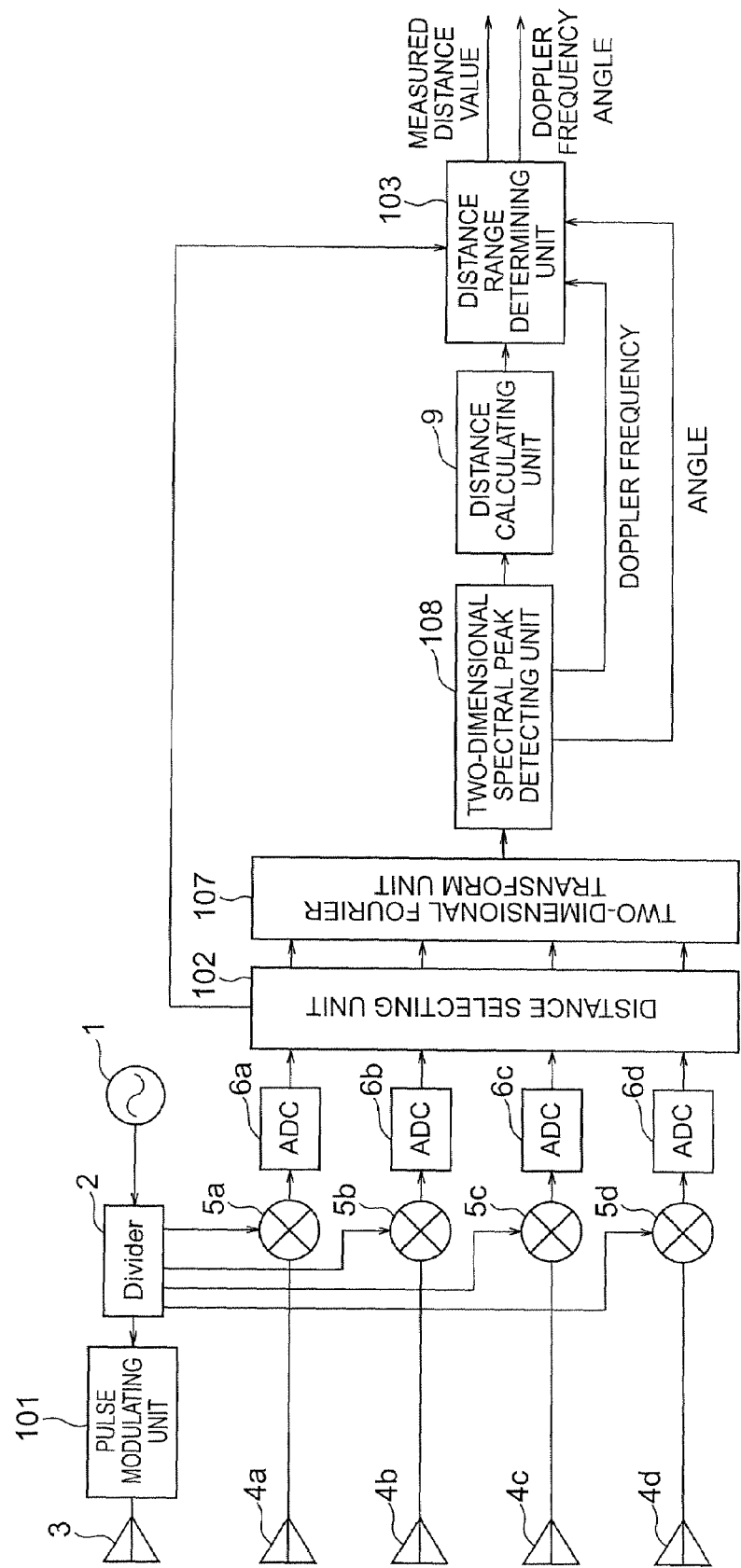
FIG. 11 is a block diagram illustrating a configuration of a radar device according to a sixth embodiment of the present invention.

FIG. 11 is a block diagram illustrating a configuration of a radar device according to the sixth embodiment of the present invention. The same components of the configuration illustrated in FIG. 11 according to the sixth embodiment as those in the third embodiment illustrated in FIG. 5 are denoted by the same reference numerals, and the description thereof is herein omitted. In contrast with the configuration illustrated in FIG. 5 according to the third embodiment, in the sixth embodiment shown in FIG. 11, the receiving antenna is composed of receiving elements 4a to 4d. Receivers 5a to 5d are connected to the respective receiving elements 4a to 4d to provide a plurality of channels. Moreover, A/D converters 6a to 6d are connected to the respective receivers 5a to 5d.

The Fourier transform unit includes a two-dimensional Fourier transform unit 107 for performing a two-dimensional Fourier transform on the two-dimensionally defined received signal, i.e., in a time direction and a receiving-element direction. The two-dimensional Fourier transform unit 107 performs a Fourier transform on the real received signals selected by and output from the distance selecting unit 102, which are generated from the plurality of receivers 5a to 5d, in an element direction to obtain a signal distribution in an angular direction. Moreover, the spectral peak detecting unit includes a two-dimensional spectral peak detecting unit 108 which detects a peak at which the amplitude is maximum for the two-dimensional Fourier transform of the received signal to output a complex amplitude, a Doppler frequency and an angle at the peak.

Furthermore, the distance determining unit includes the distance range determining unit 103. The distance range determining unit 103 compares the distance estimate obtained in the distance selecting unit 102 and the measured distance value obtained in the distance calculating unit 9 to output the measured distance value calculated in the distance calculating unit 9, and the Doppler frequency and the angle calculated in the two-dimensional spectral peak detecting unit 108 only when a difference obtained by the comparison is equal to or smaller than a predetermined value.

The operation from the generation of the transmission wave in the oscillator 1 to the selection of the distance in the distance selecting unit 102 is almost the same as that in the embodiments described above. In this sixth embodiment, however, the plurality of receiving elements and the plurality of A/D converters are provided to thereby constitute the multi-channel receiving system.

The receiving elements 4a to 4d are arranged so that their positions are slightly offset from each other. As a result, a phase difference determined by an incoming angle of the receiving wave is generated between the receiving elements. The signal processing using information of the phase difference provides an angle of the incoming wave. Specifically, the received beams can be synthesized by the signal processing. Such a technique is referred to as digital beam forming (DBF), and is conventionally well known. More specifically, the Fourier transform in the element direction provides the distribution of the received signal in the angular direction.

Figure 12:
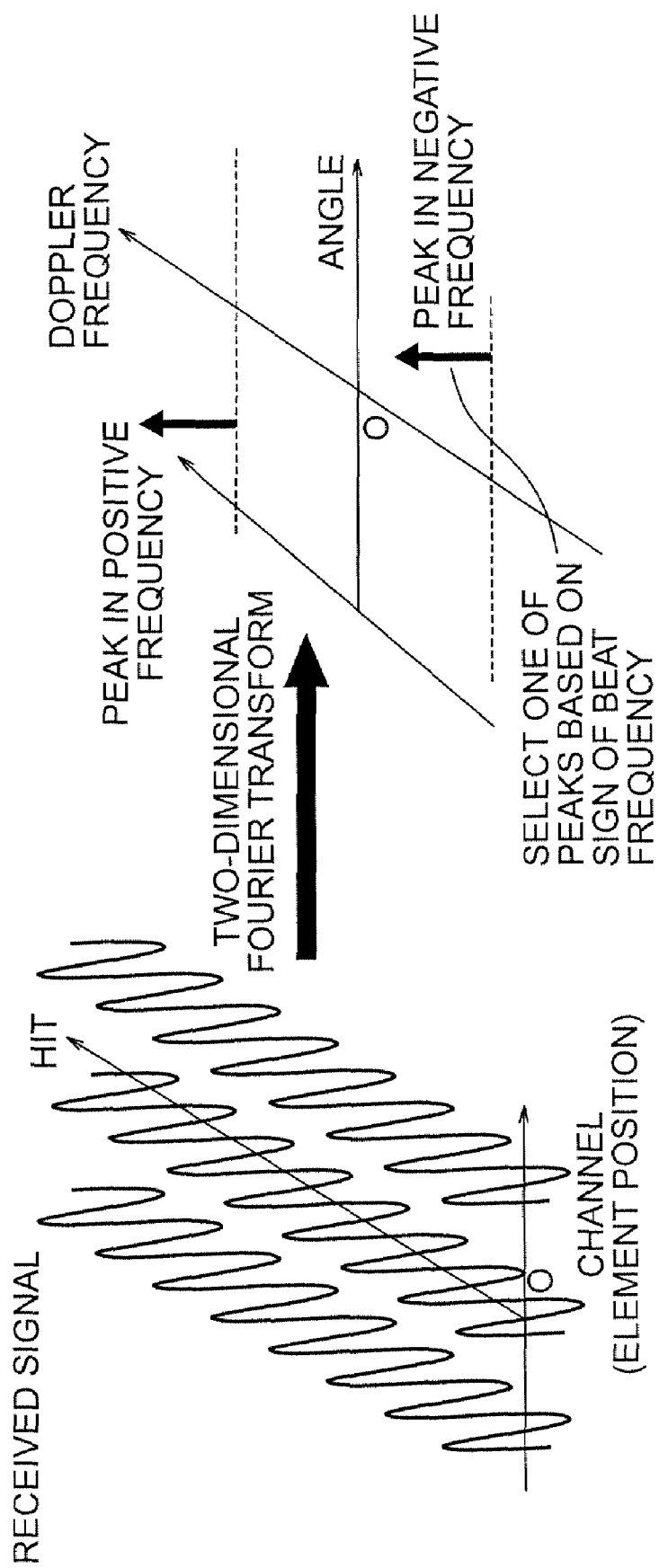
FIG. 12 is a view illustrating the principle of the radar device according to the sixth embodiment of the present invention.

In the case of the exemplary configuration illustrated in FIG. 11, the distance selecting unit 102 extracts data in the same set distance interval for all the channels. Thereafter, the two-dimensional Fourier transform unit 107 performs the two-dimensional Fourier transform. The two-dimensional Fourier transform simultaneously performs the Fourier transform in the time axis direction and in the element direction. Since the received signal in each channel is a real signal, the result of the Fourier transform contains ambiguity in the sign as in the above-mentioned embodiments. More specifically, as in the embodiments described above, simultaneously with ambiguity in the sign of the Doppler frequency, ambiguity in the sign of the angle is caused. FIG. 12 illustrates how the ambiguity is caused in the sign. As illustrated in the left part of FIG. 12, in two-dimensional space represented by the Doppler frequency and the angle, two spectral peaks are obtained for one reflecting object at the positions symmetrical with respect to the origin.

The two-dimensional spectral peak detecting unit 108 detects a peak of the two-dimensional Fourier transform and then extracts a complex amplitude of the detected peak. The distance calculating unit 9 uses a complex amplitude value obtained at the same peak position (in the same Doppler frequency and at the same angle) to perform the same distance measurement process as that in the embodiments described above. The distance range determining unit 103 verifies whether or not the measured distance value obtained in the distance calculating unit 9 falls within the distance measurement target interval set in the distance selecting unit 102. If the measured distance value falls within the distance measurement target interval, the measured distance value and the Doppler frequency are output. On the other hand, if the measured distance value does not fall within the distance measurement target interval, it is determined that the distance is measured by using the peak of the Doppler frequency with the incorrect sign to discard the result of distance measurement.

Besides the configuration illustrated in FIG. 11, the sixth embodiment can also be configured to correct the result of distance measurement supposing that the sign of the Doppler frequency is incorrect, re-determine the distance range, and then output the corrected result of distance measurement as in the fourth embodiment described above referring to FIGS. 7 and 8. Further, the sixth embodiment may be applied to the process for incomplete pulse modulation as in the fifth embodiment described referring to FIGS. 9 and 10.

Moreover, in the sixth embodiment, the determination of the sign of the angle for the case where the transmission wave is pulsed has been described. Even for the case where the transmission wave is not pulsed as in the first embodiment illustrated in FIG. 1, the determination of the sign of an angle may be similarly performed.

Specifically, the Fourier transform unit includes the two-dimensional Fourier transform unit 107 for performing the two-dimensional Fourier transform in the time direction and the element direction on the real received signals generated from a plurality of receivers. The spectral peak detecting unit includes the two-dimensional spectral peak detecting unit 108 for receiving the input of the result of the Fourier transform from the two-dimensional Fourier transform unit 107 to extract a complex signal value of the peak at which the amplitude becomes maximum. The distance determining unit outputs the measured distance value calculated in the distance calculating unit, and the Doppler frequency and the angle detected in the spectral peak detecting unit, according to the result of determination of validity of the measured distance value from the distance calculating unit. With such a configuration, the sixth embodiment is applicable to any of the first to fifth embodiments.

Two signs, that is, the sign of the Doppler frequency and that of the angle are determined in the above description. However, the radar device may have a configuration in which only the sign of the angle is determined. In this case, the Fourier transform is one-dimensionally performed only in a receiving channel direction.

Specifically, in the first to fifth embodiments, as in FIG. 11, the radar device is configured as follows. A multi-channel receiving system including the plurality of receiving antennas $4a$ to $4d$ and the plurality of receivers $5a$ to $5d$ is configured. The Fourier transform unit 7 performs the Fourier transform on the real received signals generated from the plurality of receivers $5a$ to $5d$ in the element direction. The spectral peak detecting unit 8 receives the input of the result of the Fourier transform to extract a complex signal value of the peak at an angular point at which the amplitude is maximum. As a result, the distance determining unit can output the angle together with the measured distance value in place of the Doppler frequency. Thus, the same effects as those of the first to fifth embodiments can be obtained.

As described above, in addition to the effects of the embodiments described above, the sixth embodiment has an advantage in that the angle with the correct sign can be output.

What is claimed is:

1. A radar device for emitting a wave into space, receiving the wave reflected by an object present in the space, and performing signal processing on the received wave to measure the object, comprising:
    an oscillator for generating the wave at a plurality of transmission frequencies;
    a transmitting antenna for emitting the wave generated from the oscillator into the space;
    a receiving antenna for receiving an incoming wave;
    a receiver for detecting the received wave received by the receiving antenna to generate a real received signal;
    a Fourier transform unit for performing a Fourier transform on the real received signal generated from the receiver in a time direction;
    a spectral peak detecting unit for receiving an input of a result of the Fourier transform from the Fourier transform unit to extract peak complex signal values of Doppler frequency points at which an amplitude is maximum;
    a distance calculating unit for storing the peak complex signal values from the spectral peak detecting unit, which are obtained by using the plurality of transmission frequencies, and for calculating a distance to the reflecting object based on the stored peak complex signal values to output the obtained distance as a measured distance value;
    a distance determining unit for determining validity of the measured distance value obtained from the distance calculating unit and outputting the measured distance value calculated in the distance calculating unit and the Doppler frequency detected in the spectral peak detecting unit according to a result of determination;
    a pulse modulator for performing pulse modulation on the wave generated in the oscillator; and
    a distance selecting unit for selecting real received signals having the same difference between a transmission time and a reception time from among real received signals from the receiver obtained by transmission of a plurality of pulses and outputting the selected real received signals and for outputting a distance estimate corresponding to the difference between the transmission time and the reception time, wherein:
    the transmitting antenna emits the wave having passed through the pulse modulator into the space;
    the Fourier transform unit performs the Fourier transform on the real received signals selected to be output from the distance selecting unit; and
    the distance determining unit comprises a distance range determining unit for comparing the distance estimate obtained in the distance selecting unit and the measured distance value obtained in the distance calculating unit with each other to output the measured distance value calculated in the distance calculating unit and the Doppler frequency calculated in the spectral peak detecting unit only when a difference obtained by the comparison is equal to or smaller than a predetermined value.

2. The radar device according to claim 1, wherein the distance determining unit comprises a distance sign determining unit for outputting the Doppler frequency detected in the spectral peak detecting unit only when a sign of the measured distance value calculated in the distance calculating unit is positive.

3. The radar device according to claim 1, wherein the distance determining unit comprises:
    a distance sign determining unit for determining a sign of the measured distance value calculated in the distance calculating unit as positive or negative and for outputting the measured distance value obtained in the distance calculating unit; and
    a sign reversing unit for reversing a sign of the Doppler frequency from which the peak complex signal value obtained in the spectral peak detecting unit is extracted and outputting the Doppler frequency with the reversed sign when the sign of the measured distance value calculated in the distance calculating unit is determined as negative by the distance sign determining unit.

4. The radar device according to claim 1, further comprising:
- a pulse modulator for performing pulse modulation on the wave generated in the oscillator; and
- a distance selecting unit for selecting real received signals having the same difference between a transmission time and a reception time from among real received signals from the receiver obtained by transmission of a plurality of pulses and outputting the selected real received signals and for outputting a distance estimate corresponding to the difference between the transmission time and the reception time, wherein:
- the transmitting antenna emits the wave having passed through the pulse modulator into the space;
- the Fourier transform unit performs the Fourier transform on the real received signals selected to be output from the distance selecting unit; and
- the distance determining unit comprises:
- a distance determination correcting unit for comparing the distance estimate obtained in the distance selecting unit and the measured distance value calculated in the distance calculating unit with each other, correcting the measured distance value supposing that a sign of the Doppler frequency is reversed when a difference obtained by the comparison is equal to or larger than a predetermined value, and outputting the corrected measured distance value; and
- a distance range re-determining unit for comparing the corrected measured distance value obtained in the distance determination correcting unit with the distance estimate and outputting the corrected measured distance value and a sign-reversed Doppler frequency obtained by reversing the sign of the Doppler frequency only when a difference obtained by the comparison is equal to or smaller than the predetermined value.

5. The radar device according to claim 1, further comprising an amplitude determining unit provided between the spectral peak detecting unit and the distance calculating unit, wherein the amplitude determining unit compares a ratio of an amplitude value having the difference between the transmission time and the reception time at which a maximum amplitude value is obtained and another amplitude value when a plurality of the peak complex signal values are obtained from the same Doppler frequency in the result of the Fourier transform obtained from received signal samples obtained by sampling the received signal at different differences between the transmission time and the reception time and eliminates the peak complex signal value at the difference between the transmission time and the reception time at which the amplitude value whose ratio is smaller than the predetermined reference is obtained.

6. The radar device for emitting a wave into space, receiving the wave reflected by an object present in the space and performing signal processing on the received wave to measure the object, comprising:
- an oscillator for generating the wave at a plurality of transmission frequencies;
- a transmitting antenna for emitting the wave generated from the oscillator into the space;
- a plurality of receiving antennas for receiving an incoming wave;
- a plurality of receivers for detecting the received wave received by the plurality of receiving antennas to generate a real received signal;
- a Fourier transform unit for performing a Fourier transform on the real received signal generated from the plurality of receivers in an element direction;
- a spectral peak detecting unit for receiving an input of a result of the Fourier transform from the Fourier transform unit to extract peak complex signal values of angle points at which an amplitude is maximum;
- a distance calculating unit for storing the peak complex signal values from the spectral peak detecting unit, which are obtained by using the plurality of transmission frequencies, and calculating a distance to the reflecting object based on the stored peak complex signal values to output the obtained distance as a measured distance value;
- a distance determining unit for determining validity of the measured distance value obtained from the distance calculating unit and for outputting the measured distance value calculated in the distance calculating unit and the angle detected in the spectral peak detecting unit according to a result of determination;
- a pulse modulator for performing pulse modulation on the wave generated in the oscillator; and
- a distance selecting unit for selecting real received signals having the same difference between a transmission time and a reception time from among real received signals from the plurality of receivers obtained by transmission of a plurality of pulses and outputting the selected real received signals and for outputting a distance estimate corresponding to the difference between the transmission time and the reception time, wherein:
- the transmitting antenna emits the wave having passed through the pulse modulator into the space;
- the Fourier transform unit performs the Fourier transform on the real received signals selected to be output from the distance selecting unit; and
- the distance determining unit comprises a distance range determining unit for comparing the distance estimate obtained in the distance selecting unit and the measured distance value obtained in the distance calculating unit with each other to output the measured distance value calculated in the distance calculating unit and the angle calculated in the spectral peak detecting unit only when a difference obtained by the comparison is equal to or smaller than a predetermined value.

7. The radar device according to claim 6, wherein the distance determining unit comprises a distance sign determining unit for outputting the angle detected in the spectral peak detecting unit only when a sign of the measured distance value calculated in the distance calculating unit is positive.

8. The radar device according to claim 6, wherein the distance determining unit comprises:
- a distance sign determining unit for determining a sign of the measured distance value calculated in the distance calculating unit as positive or negative and for outputting the measured distance value obtained in the distance calculating unit; and
- a sign reversing unit for reversing a sign of the angle from which the peak complex signal value obtained in the spectral peak detecting unit is extracted and outputting the angle with the reversed sign when the sign of the measured distance value calculated in the distance calculating unit is determined as negative by the distance sign determining unit.

9. The radar device according to claim 6, further comprising:
- a pulse modulator for performing pulse modulation on the wave generated in the oscillator; and
- a distance selecting unit for selecting real received signals having the same difference between a transmission time and a reception time from among real received signals from the plurality of receivers obtained by transmission of a plurality of pulses and outputting the selected real received signals and for outputting a distance estimate corresponding to the difference between the transmission time and the reception time, wherein:

the transmitting antenna emits the wave having passed through the pulse modulator into the space;

the Fourier transform unit performs the Fourier transform on the real received signals selected to be output from the distance selecting unit; and the distance determining unit comprises:

a distance determination correcting unit for comparing the distance estimate obtained in the distance selecting unit and the measured distance value calculated in the distance calculating unit with each other, correcting the measured value supposing that a sign of the angle is reversed when a difference obtained by the comparison is equal to or larger than a predetermined value, and for outputting the corrected measured distance value; and a distance range re-determining unit for comparing the corrected measured distance value obtained in the distance determination correcting unit with the distance estimate and for outputting the corrected measured distance value and a sign-reversed angle obtained by reversing the sign of the angle only when a difference obtained by the comparison is equal to or smaller than the predetermined value.

10. The radar device according to claim 7, further comprising an amplitude determining unit provided between the spectral peak detecting unit and the distance calculating unit, wherein the amplitude determining unit compares a ratio of an amplitude value having the difference between the transmission time and the reception time at which a maximum amplitude value is obtained and another amplitude value when a plurality of the peak complex signal values are obtained from the same angle in the result of the Fourier transform obtained from received signal samples obtained by sampling the received signal at different differences between the transmission time and the reception time and eliminates the peak complex signal value at the difference between the transmission time and the reception time at which the amplitude value whose ratio is smaller than the predetermined reference is obtained.

11. The radar device according to claim 6, wherein:

the Fourier transform unit comprises a two-dimensional Fourier transform unit for performing a two-dimensional Fourier transform in a time direction and the element direction on the real received signals generated from the plurality of receivers;

the spectral peak detecting unit comprises a two-dimensional spectral peak detecting unit for receiving an input of the result of the Fourier transform from the two-dimensional Fourier transform unit to extract the peak complex signal value at which the amplitude is maximum; and the distance determining unit outputs the measured distance value calculated in the distance calculating unit and Doppler frequency and the angle detected in the spectral peak detecting unit according to the result of determination of validity of the measured distance value from the distance calculating unit.

* * * * *